US011887072B2

(12) United States Patent
Ornelas et al.

(10) Patent No.: US 11,887,072 B2
(45) Date of Patent: Jan. 30, 2024

(54) DIGITAL CURRENCY MINTING IN A SYSTEM OF NETWORK NODES IMPLEMENTING A DISTRIBUTED LEDGER

(71) Applicant: Bitt Inc., Draper, UT (US)

(72) Inventors: Michael D. Ornelas, Draper, UT (US); Kent Ortell Pollard Bull, Salt Lake City, UT (US); Brad Welker, Bountiful, UT (US); Darren Sessions, Salt Lake City, UT (US); Kevin Kraig Steffensen, MIdvale, UT (US); Haresh Richardson Singh, St. Philip (BB)

(73) Assignee: Bitt Inc., Draper, UT (US)

( * ) Notice: Subject to any disclaimer, the term of this patent is extended or adjusted under 35 U.S.C. 154(b) by 178 days.

(21) Appl. No.: 17/104,411

(22) Filed: Nov. 25, 2020

(65) Prior Publication Data

US 2021/0182806 A1 Jun. 17, 2021

Related U.S. Application Data

(60) Provisional application No. 62/946,536, filed on Dec. 11, 2019.

(51) Int. Cl.
*G06Q 40/02* (2023.01)
*G06Q 40/04* (2012.01)
(Continued)

(52) U.S. Cl.
CPC ......... *G06Q 20/0655* (2013.01); *G06F 16/27* (2019.01); *G06Q 20/3672* (2013.01);
(Continued)

(58) Field of Classification Search
CPC ..... H04L 9/3247; H04L 9/30; G06Q 20/3829; G06Q 20/3825; G06Q 20/40145;
(Continued)

(56) References Cited

U.S. PATENT DOCUMENTS 7,711,120 B2 * 5/2010 Kimmel .................. H04L 9/088
380/282
8,041,644 B2 10/2011 Ogg et al.
(Continued)

FOREIGN PATENT DOCUMENTS

GB          2549118 A  * 10/2017 ............. G06Q 20/02
KR     20190100177 A     8/2019
WO      2007102907 A2    9/2007

OTHER PUBLICATIONS

Grossman, Jonathan H.; Passing cash from bank notes to bitcoin: standardizing money; Journal of cultural economy, 2019, vol. 12 (4), p. 299-316.*

(Continued)

*Primary Examiner* — Ilse I Immanuel
(74) *Attorney, Agent, or Firm* — Fogg & Powers LLC

(57) ABSTRACT

A system includes at least a first computing device, at a financial institution, configured to generate a currency request and apply first-level signature(s) to the currency request. A minting request is generated from the currency request and the first-level signature(s). The system also includes at least a second computing device, at a currency management department, configured to apply second-level signature(s) to the minting request to generate a signed minting request. The system also includes a third computing device, at a director's office, configured to apply third-level signature(s) to the signed minting request. The system also includes a plurality of network nodes, implementing a distributed ledger, configured to verify the first-level signature(s), the second-level signature(s), and the third-level signature(s); and mint the digital currency when the first-level signature(s), the second-level signature(s), and the third-level signature(s) are successfully verified.

34 Claims, 11 Drawing Sheets

(51) Int. Cl.
    *G06F 16/27*     (2019.01)
    *H04L 9/30*     (2006.01)
    *G06Q 10/10*     (2023.01)
    *G06Q 20/06*     (2012.01)
    *G06Q 20/36*     (2012.01)
    *G06Q 20/38*     (2012.01)
    *H04L 9/32*     (2006.01)
    *G06Q 20/40*     (2012.01)

(52) U.S. Cl.
CPC ....... *G06Q 20/389* (2013.01); *G06Q 20/3825* (2013.01); *G06Q 20/3827* (2013.01); *G06Q 20/3829* (2013.01); *G06Q 20/401* (2013.01); *G06Q 40/02* (2013.01); *G06Q 40/04* (2013.01); *H04L 9/30* (2013.01); *H04L 9/3247* (2013.01); *G06Q 10/10* (2013.01); *G06Q 2220/00* (2013.01)

(58) Field of Classification Search
CPC ...... G06Q 20/04; G06Q 20/02; G06Q 20/388; G06Q 20/38215; G06Q 40/04; G06F 16/27
See application file for complete search history.

(56) References Cited

U.S. PATENT DOCUMENTS

| | | | |
|---|---|---|---|
| 8,565,422 | B2 | 10/2013 | Lee et al. |
| 8,725,643 | B2 | 5/2014 | Brown et al. |
| 8,879,728 | B2 | 11/2014 | MacMillan et al. |
| 8,964,990 | B1 | 2/2015 | Baer et al. |
| 9,002,018 | B2 | 4/2015 | Wilkins et al. |
| 9,106,426 | B2 | 8/2015 | Schneider |
| 9,608,813 | B1 | 3/2017 | Roth et al. |
| 9,705,674 | B2 | 7/2017 | Roth et al. |
| 10,382,200 | B2 | 8/2019 | Roth |
| 10,467,422 | B1 | 11/2019 | Roth et al. |
| 10,693,658 | B2 * | 6/2020 | Jacobs ................ H04W 12/106 |
| 11,308,487 | B1 * | 4/2022 | Foster ................ G06Q 20/3829 |
| 2002/0029337 | A1 * | 3/2002 | Sudia .................... H04L 9/3268 380/282 |
| 2005/0172132 | A1 | 8/2005 | Chen et al. |
| 2013/0283042 | A1 | 10/2013 | Xiao |
| 2016/0267472 | A1 | 9/2016 | Lingham et al. |
| 2017/0237554 | A1 | 8/2017 | Jacobs et al. |
| 2018/0268382 | A1 | 9/2018 | Wasserman |
| 2019/0306235 | A1 | 10/2019 | Veale et al. |

OTHER PUBLICATIONS

International Searching Authority, "International Search Report and Written Opinion from PCT Application No. PCT/US2020/064186", from Foreign Counterpart to U.S. Appl. No. 17/104,411, filed Apr. 8, 2021, pp. 1 through 9, Published: WO.

Amsden et al., "The Libra Blockchain", at least as early as Jun. 15, 2019, pp. 1 through 29.

* cited by examiner

DIGITAL CURRENCY MINTING IN A SYSTEM OF NETWORK NODES IMPLEMENTING A DISTRIBUTED LEDGER

CROSS-REFERENCE TO RELATED APPLICATIONS

This application claims priority to U.S. Provisional Patent Application Ser. No. 62/946,536 filed on Dec. 11, 2019 and entitled "DIGITAL CURRENCY MINTING IN A SYSTEM OF NETWORK NODES IMPLEMENTING A DISTRIBUTED LEDGER," which is hereby incorporated by reference in its entirety.

BACKGROUND

Cryptography can be used to securely store and transmit data. Keys can be used to encrypt, decrypt or sign data or to sign transactions.

SUMMARY

A system includes at least a first computing device, at a financial institution, configured to generate a currency request and apply first-level signature(s) to the currency request. A minting request is generated from the currency request and the first-level signature(s). The system also includes at least a second computing device, at a currency management department, configured to apply second-level signature(s) to the minting request to generate a signed minting request. The system also includes a third computing device (e.g., an air-gapped computing device), at a director's office, configured to apply third-level signature(s) to the signed minting request. The system also includes a plurality of network nodes, implementing a distributed ledger, configured to verify the first-level signature(s), the second-level signature(s), and the third-level signature(s); and mint the digital currency when the first-level signature(s), the second-level signature(s), and the third-level signature(s) are successfully verified.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
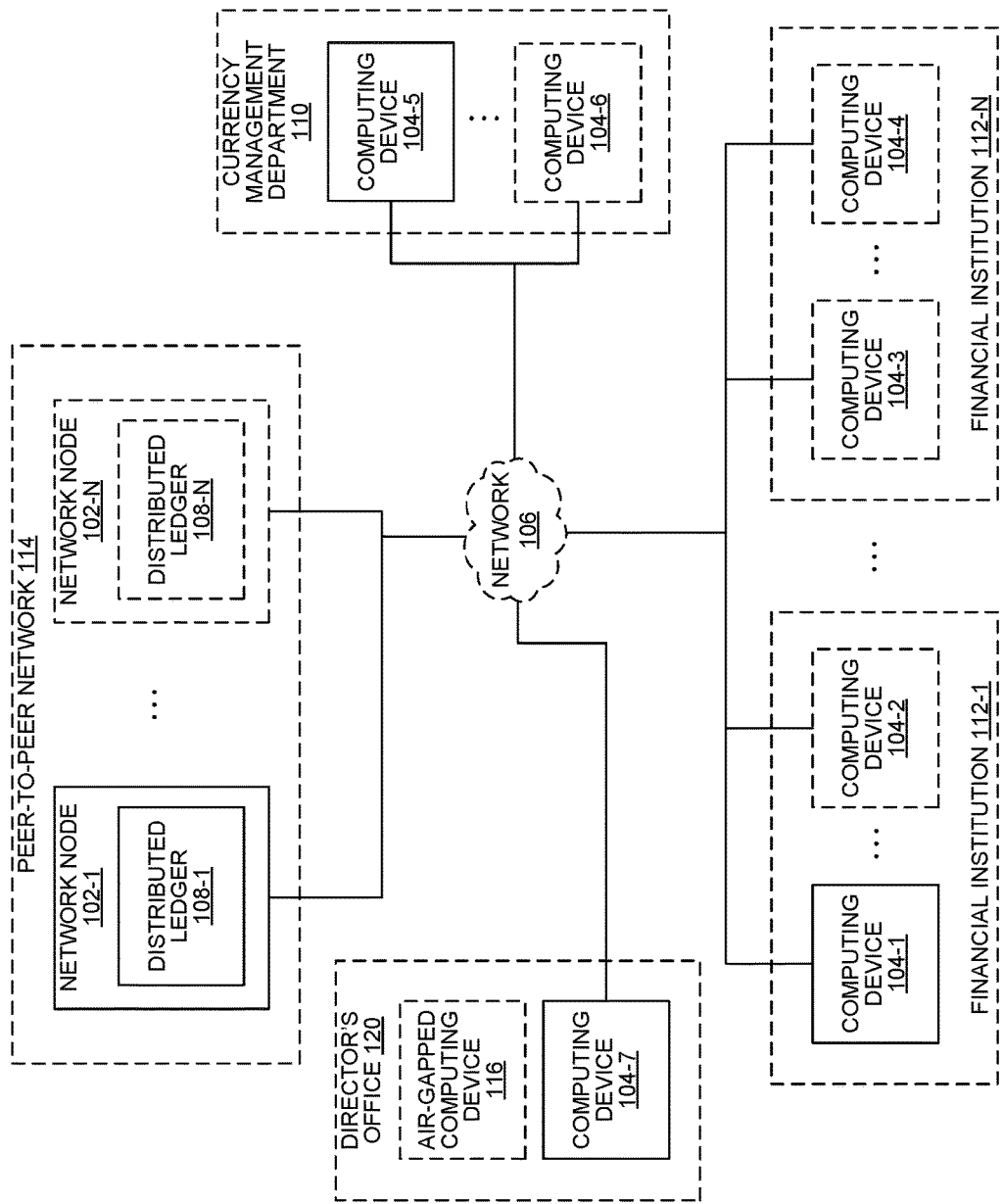
FIG. 1 is block diagram illustrating an example system for minting digital currency in a system of network nodes implementing a distributed ledger.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Keys, including cryptographic keys, can be used to sign, verify a signature, encrypt and/or decrypt digital data. Keys can include (but are not limited to) private keys, public keys, and other cryptographic keys as well as passwords and secrets. In examples, a key may be embodied as a string of characters.

In some configurations, keys may be used to cryptographically sign data. A "public/private keypair," which includes a private key and a corresponding public key, may be used in signing data and verifying (also called "validating") the signature. Specifically, a private key may be used to sign data (at the transmitting device), after which a receiver of the signed data can verify that the data was signed by the creator of the corresponding public key, assuming the receiving/verifying device already knows the signing public key. In other words, signing can be used to verify that a data was signed by a trusted source. In some configurations, the private key used for signing is generated and stored on a hardware authentication device, e.g., a Yubikey® or other HSM device by Yubico®. A hardware authentication device requires that a specific hardware device be presented with the private key in order for the private key to be used (instead of generating a private key on a first device and transferring it to one or more other devices). One type of hardware authentication device is a hardware security module (HSM), which generates, and stores one or more private keys. An HSM may be communicatively coupled to a computing device and used to apply signature(s) with the private key(s) that it stores. An HSM may have an associated attestation token that certifies the HSM complies with a certain set of physical security and accessibility criteria.

In examples, the signing described herein uses Pretty Good Privacy (PGP) encryption. In examples, a signature can be added to a payload of data by: (1) using a cryptographic hashing function on the payload to produce a hash (also called a "digest") of the payload; (2) encrypting the hash/digest with the private key; and (3) appending or otherwise attaching the encrypted hash/digest to the payload. In order to verify the signature: (1) the signature (e.g., appended portion) is decrypted with the public key corresponding to the private key used for signing; (2) a hash is taken of the original payload; and (3) the decrypted hash from (1) is compared with the hash (from (2)) to determine if both are the same. The signature is verified only if the decrypted hash from (1) is the same as the hash (from (2)).

While PGP is used as an example asymmetric protocol that can be utilized for signing data, different protocols can be used. In examples, other non-PGP protocols based on Rivest-Shamir-Adleman (RSA) and/or Elliptic Curve Cryptography (ECC) may be utilized, such as one of the Edwards-curve Digital Signature Algorithm (EdDSA) standards, e.g., Ed25519. Regardless of the specific signing or encryption protocol used, the term "signing" and its variants are used herein to refer to a process involving a private key is used to associate additional data (a "signature") with the data that is being signed (a "payload").

In examples, a cryptographic hashing function takes an input (e.g., a payload) and returns a hash/digest (a string of characters). The input (e.g., payload) to a hashing function is uniquely deterministic of the output (the hash). In other words, the hashing function will only produce a hash of a particular value from one particular input (e.g., payload), and any change to the input (e.g., payload) will produce a different hash. Examples of hashing functions that could be used include, without limitation: SHA-1, SHA-256, SHA-512, MD4, MD5, RIPEMD160, etc.

Furthermore, in some configurations, a first signature (applied to data using a first private key) may be further signed with additional private keys, e.g., creating multiply-signed data. In the case of multiply-signed data, a first signature may be applied to a payload by hashing and encrypting the payload (and attaching to the payload), while a second signature may be applied by hashing and encrypting the first signature and the payload (and attaching to the first signature). Alternatively, the second signature may be applied by hashing and encrypting only the first signature.

As used herein, the term "distributed ledger" refers to an electronic ledger that is distributed across multiple interconnected nodes, where more than one of the nodes stores a copy of the ledger. In examples, a distributed ledger may implement one or more blockchains to validate the data stored within the distributed ledger. A blockchain is a verifiable permanent ledger constructed one block at a time with a proof-of-work seal (such as a hash) affixed to each block that validates that block. In a blockchain, the hash of the previous block is included in the current block, and therefore by recursion the current hash also validates all previous blocks back to the original genesis block. Inserting a hash into a blockchain permanently records that hash and acts as a notary verifying the time stamped proof-of-existence of the hashed data at the moment in time that block is added to the chain. Any future blocks add a layer of protection from manipulation of the data stored in the chain or a chain re-organization and therefore provide additional certainty that no changes can be made to blocks earlier in the chain. A blockchain is an implementation of a distributed ledger, and may be public (i.e., viewable by anyone) or private. Exemplary blockchains include, but are not limited to, the Bitcoin blockchain, the Ethereum blockchain, BigchainDB, Billon, Chain, Corda, Credits, Elements, Monax, Fabric, HydraChain, Hyperledger Fabric (HLF), Multichain, Openchain, Quorum, Sawtooth, and Stellar.

Governments have an interest in controlling their money supply. In order to create additionally currency, governments will "mint" (or create) more currency and put it into circulation. Conversely, governments can also destroy currency to tighten the supply. Some governments may seek to digitize their currency using a blockchain, e.g., to increase transparency, reduce transaction fees, increase the speed of transactions, bridge the trust gap in transactions, etc. In some configurations, a currency may be converted to a digital currency by converting each unit of currency to a cryptographic token (representing a unit of digital currency) on a blockchain platform, e.g., each Eastern Caribbean Dollar (XCD) can be converted to a token, representing a Digital Eastern Caribbean Dollar (DXCD), on the Hyperledger Fabric blockchain platform. Accordingly, digital currency and a token representing digital currency may be referred to interchangeably herein. Once digitized, tokens representing digital currency may be transferred (e.g., in exchange for goods and services) using transactions performed on the blockchain. In examples, each token may represent a fixed amount of digital currency, e.g., one token represents one penny (0.01 XCD). Alternatively or additionally, each token can have a scalar value so different tokens could represent different amounts, e.g., a first token could represent $10 of XCD, while a second token represents $2838.18 of XCD, etc.

When digitizing a currency, it may be desirable to put the control of the money supply into the hands of currency system controllers (to increase or reduce money supply as needed) and to facilitate a control process that requires more than one person signing off on certain actions. Accordingly, the present systems and methods enable (1) control over digital monetary supply; and (2) segregation of duties in the digital minting process where different individuals cryptographically sign requests. In examples, the individuals that cryptographically sign at an institution are agents (e.g., employee, contractor, appointed official, elected official) authorized to act on behalf of the institution. Optionally, the systems and methods described herein utilize an air-gapped offline computing system to partially generate minting requests for an added layer of security.

Some blockchains, such as Bitcoin or Ethereum, have a fixed quantity of tokens. Accordingly, they may not be good candidates for governments to use when digitizing a currency. In other words, many blockchains are not good candidates to use if a country wishes to digitize their currency because they do not allow for a monetary authority within a government to control the supply of their currency. In examples, the present systems and methods may run on Hyperledger Fabric (HLF), which is a permissioned, private blockchain platform (e.g., running on public nodes). HLF is considered permissioned because network administrator(s) can control who is granted access (read and/or write) to the HLF blockchain, using access control lists. The access control can be granular at the user level, the type of access (read or write) granted a user, the type of data accessible by the user, etc. Furthermore, the present systems and methods may run on any suitable blockchain platform, e.g., a private, permissioned blockchain platform; a private, permissionless blockchain platform, etc.

Assets are represented in Hyperledger Fabric as a collection of key-value pairs, with state changes recorded as transactions on a ledger. Assets can be represented in binary, JavaScript Object Notation (JSON) form, and/or any other suitable format. Hyperledger Fabric provides the ability to modify assets using transactions implemented in chaincode (or "smart contract(s)"). In examples, data is transported herein via the blockchain (e.g., HLF) where it's always visible in the transaction history. When data is described as being recorded on a distributed ledger herein, it is understood that the data itself and/or a hash of the data is recorded in the distributed ledger. In some configurations, a hash of data is recorded in the distributed ledger, while the data itself is stored off-ledger. Additionally, other formatting may be done on the various data generated, signed, and/or stored herein. Accordingly, where data is described as being formatted into a JSON representation herein, it could additionally or alternatively be formatted into a binary file (with a ".bin" extension), a text file (with a ".txt" extension), an Extensible Markup Language file (with an ".xml" extension), etc.

The system described herein may include N financial institutions (e.g., N is greater than or equal to 1) sending currency request(s) indicating a request for more digital currency. Each request may be signed by one or more different first-level individuals, each using a private key controlled only by that individual. Alternatively, more than one first-level individuals can share a single private key, e.g., each first-level individual has a user account by which they are able to gain access to the private key. In either case, the currency request(s) can be transmitted (e.g., via HLF) to a currency management department, where each is optionally formatted into a minting request that is signed by one or more second-level individuals. In some configurations, a minting request is only generated in response to a particular currency request if the central bank does not have enough digital currency reserve to meet the needs of the currency request. If the central bank has enough digital currency reserves, a minting request is not generated. If the central bank does not have enough digital currency reserves, a minting request is generated for the currency request.

If generated, the minting request can be transmitted (e.g., via HLF and/or a Universal Serial Bus (USB) drive) to a computing device (e.g., an air-gapped computing device) where it is signed by one or more third-level agents of a director's office. The third-level-signed minting request can then be passed to a smart contract on the HLF executing the minting process. In examples, the minting can include modifying state of the smart contract to increase the total supply of currency. As described above, each signature may use a different private key. After each private key is generated, the corresponding public key can be placed into the HLF as an active key.

In examples, one or more of the private keys can be rotated, periodically or on-demand, where a new version (of each key being rotated) is generated that is not derivable (mathematically independent) from the old version. Each time a private key is rotated, a corresponding public key is also rotated, e.g., generated and stored in the distributed ledger 108 as an active public key. When the third-level-signed minting request is received at the smart contract, the signatures may be verified, using the active keys in the HLF, in the same or reverse order that they were applied (or any other order). In examples, even though the signatures can be verified in any order, all first-level signatures must be applied before all second-level signatures and all second-level signatures must be applied before all third-level signatures.

Several aspects of the present systems and methods make the digital minting request process secure. First, multiple agents sign using respective private keys (or key parts) in order to request that digital currency be minted, thus minimizing the risk that all the private keys could be compromised. Second, the keys are rotated periodically, e.g., the rotation periods may be staggered so they are not all rotated at once. In examples, rotating a key includes generating a new key that is not derivable from the old key being rotated. Therefore, compromising the process would require compromising multiple keys before the next rotation occurs. Furthermore, in some configurations, the new key is signed with the old private key as described herein, thus cryptographically proving that the new key came from the same trusted source as the old key. Third, a separation of duties (among the various signers) is enforced because the different signatures are verified based on the level at which the signatures are expected to be applied, e.g., a first signature is only verified against first-level public key(s) in the distributed ledger. Accordingly, even if a malicious actor were able to compromise the private keys, they would still need to know the level at which each of the original signatures were expected to be applied before they could generate a fraudulent minting request with signatures that would correctly verify. Fourth, storing the data and signatures on a distributed ledger provides transparency and traceability. Every digital cent would be able to be traced to a currency request and minting request. The ledger would help prevent unaccounted currency from being created—if a breach or collision were to occur, it would be able to be traced and audited on the immutable ledger. Each signature can be traced to in individual as well as when it was signed in each step.

Additionally, the systems and methods described herein are not limited to minting new digital currency. In examples, non-currency digital assets (e.g., a software program, a digital movie, digital music, a video game, achievements within a video game ecosystem (a weapon, achievement, costume, etc.)) may be generated using a similar process. In examples, a first-level institution generates a request that additional digital assets be generated, which is signed by at least one first-level private keys (whose corresponding public keys are stored on a distributed ledger), after which the request is signed at one or more subsequent levels of institutions, each with at least one private key specific to that level (whose corresponding public keys are stored on a distributed ledger). The fully-signed request can then be verified (using the public keys on the distributed ledger) by verifying that all first-level signatures were applied before all second-level signatures (and if relevant, all second-level signatures were applied before all third-level signatures). If the fully-signed request is successfully verified, the additional digital assets can be generated. In some configurations, the verification and generation of the additional digital assets is performed in one or more smart contracts. In some configurations, the verification is performed in a smart contract, and the generation is performed a manufacturer or publisher of the digital assets in response to the smart contract successfully verifying the fully-signed request.

FIG. 1 is block diagram illustrating an example system 100 for minting digital currency in a system of network nodes 102 implementing a distributed ledger 108. The system 100 includes a peer-to-peer (P2P) network 114, e.g., that implements a Hyperledger Fabric (HLF) blockchain. Alternatively, the P2P network 114 may implement a different blockchain, e.g., a different blockchain that is permissioned and/or private. The P2P network 114 may include N network nodes 102, e.g., network node 102-1 through network node 102-N. Each network node 102 may store a copy of a distributed ledger 108, e.g., a copy of an HLF blockchain.

The system 100 may also include N financial institutions 112, e.g., financial institution 112-1 through financial institution 112-N. Each financial institution 112 may include one or more computing devices 104, e.g., computing device 104-1 through computing device 104-4. In some configurations, the financial institutions 112 may be licensed, by one or more relevant governmental agencies, to deposit customer currency. Without limitation, examples of financial institutions 112 include retail or commercial banks, credit unions, savings and loan organizations, etc. Since a financial institution 112 frequently receives deposits and makes loans, it may need additional currency, e.g., in order to comply with various applicable laws, rules, and/or regulations. Accordingly, a financial institution 112 may generate a currency request that includes an amount of currency requested, a time stamp the currency request was generated, and/or an ID of the requester (e.g., that can be traced to an individual). In examples, each financial institution is a regional office of a bank or credit union and/or a branch of the bank or credit union.

Various signatures may be required to mint additional digital currency according to a signature hierarchy. In examples, one or more signatures are required at a first level, one or more signatures are required at a second level, and one or more signatures are required at a third level. In examples, the number of levels in the system 100 and/or the number of signatures required at each level can be configurable, e.g., by the central bank responsible for managing the digital currency that is being minted.

The financial institution(s) 112 may be considered a "first level" in the signature hierarchy of the digital minting process herein. Accordingly, when a private key is generated for an agent of a financial institution 112 (to be used in signing currency requests), the corresponding public key is recorded in the distributed ledger 108 and designated as a first-level public key. The currency request may be signed by one or more agents, each using a private key that only they control (or primarily control). In examples, each currency request is signed by two agents of the same financial institution 112, where the two signatures are added using the same or different computing devices 104.

The system 100 may also include a currency management department 110 within a central bank. A central bank is a governmental or quasi-governmental institution that manages the supply of currency and interest rates for a country or countries and is run by a board of directors (or "governors"), e.g., the Eastern Caribbean Central Bank (ECCB) is an example, which controls the supply of the Eastern Caribbean Dollar (XCD). The currency management department 110 (e.g., the Currency Management Department (CMD) within the ECCB) may be a department within a central bank. The currency management department 110 may be considered a "second level" in the signature hierarchy of the digital minting process herein. Accordingly, when a private key is generated for an agent of the currency management department 110 (to be used in signing minting requests), the corresponding public key is recorded in the distributed ledger 108 and designated as a second-level public key. The currency management department 110 may own and/or operate one or more computing devices 104 used to generate a minting request, e.g., computing device 104-5 through computing device 104-6. In some configurations, a minting request is only generated in response to a particular currency request if the central bank does not have enough digital currency reserve to meet the needs of the currency request. If the central bank has enough digital currency reserves, a minting request is not generated. If the central bank does not have enough digital currency reserves, a minting request is generated for the currency request.

It is desirable for the currency management department 110 to control the supply of the digital currency (e.g., Digital Eastern Caribbean Dollars (DXCD)), similar to how the supply of non-digital currency is controlled. In order to control the supply of the digital currency, the currency management department 110 may (1) receive (e.g., via the distributed ledger 108) a signed (e.g., multiply-signed) currency request; (2) format the currency request(s) into minting request(s) that is/are signed by one or more additional individuals (e.g., who are agents by the currency management department 110); and (3) send (e.g., via the distributed ledger 108) the signed minting request(s) to a director's office 120 for third-level signatures.

The system 100 may include at least one director's office 120 having at least one computing device 104-7 and/or an air-gapped computing device 116. The air-gapped computing device 116 does not have any wireless radios (e.g., no Wi-Fi, Bluetooth, cellular, WAN, etc.) or other network access to other computers (e.g., LAN), but may have removable storage drives or ports. The director's office 120 may be considered a "third level" in the signature hierarchy of the digital minting process herein. Accordingly, when a private key is generated for an agent of a director's office 120 (to be used in signing minting requests), the corresponding public key is recorded in the distributed ledger 108 and designated as a third-level public key.

In examples, data is transferred to and from the air-gapped computing device 116 via removable storage, e.g., via a USB drive plugged directly into the air-gapped computing device 116. In examples, the air-gapped computing device 116 is a secure laptop, e.g., protected with password, biometric authentication, two-factor authentication, and/or any other authentication method. Although not shown, the optional air-gapped computing device 116 may be communicatively coupled to a hardware security module (HSM), e.g., an external device that generates, manages, and/or stores one or more public and/or private keys utilized during the signing and/or verification process. In example, the HSM is Federal Information Processing Standard (FIPS) 140 (e.g., FIPS 140-2) compliant, which requires that the HSM meet certain physical security and accessibility criteria. For example, FIPS 140-2 level 1 certification requires production-grade equipment and externally tested algorithms; FIPS 140-2 level 2 certification requires all the level 1 requirements plus features that the device show evidence of physical tampering and implement rule-based authentication; FIPS 140-2 level 3 certification requires all the level 2 requirements plus features for physical tamper resistance and identity-based authentication.

In examples, the minting request is transferred (e.g., via removable storage) to the air-gapped computing device 116 for at least one of the third-level signatures to be applied by a director-level agent of the currency management department 110, e.g., using an HSM. In examples, the third-level signature(s) may be the last signature(s) before the signed minting request is transferred back to a computing device 104-7 and sent to the smart contract implemented in the distributed ledger 108.

Up to this point, each private key has been described as being controlled by a single agent of an institution, e.g., financial institution 112, currency management department 110, director's office 120. Alternatively, more than one agent of a particular institution (e.g., financial institution 112, currency management department 110, director's office 120) can share a single private key used to sign data. In such examples, each of multiple agents of an institution can have a user account, which they use to gain access (e.g., via some authentication process) to the private key and apply signatures. For example, if dozens, hundreds, or thousands of agents of a particular financial institution 112 are all authorized to apply first-level signatures, a first agent may log in to their user account and use a private key to apply a first first-level signature after which a second agent may optionally log in to their user account and use the same private key to apply a second first-level signature. Furthermore, a single private key could optionally be shared between institutions in some examples, e.g., if a group of agents authorized to act on behalf of the currency management department 110 overlaps (or is identical) with a group of agents authorized to act on behalf of the director's office 120. However, when two or more signatures are applied at a particular level (e.g., two second-level signatures), each of those two or more signatures must be applied by different people, even if they share a single private key.

The term "smart contract" refers to a set of conditional logic that may be implemented in software, e.g., one or more sequential steps that are executed in response to one or more relevant conditions being satisfied. A smart contract may be stored at an address of a distributed ledger 108. In the context of HLF, a smart contract may be referred to as "chaincode". In examples, smart contracts implemented on HLF may be programmed in the Golang or JavaScript programming languages, although other languages can be used. In examples, smart contracts may be executed by a processor on a network node 102, e.g., that is running a virtual machine. In examples, one or more parameters may be passed to the smart contract and/or one or more parameters may be passed from the smart contract following execution.

In examples, the minting process is performed by a smart contract implemented in the distributed ledger 108 (e.g., HLF). In examples, one of the computing devices 104 at the director's office 120 sends the minting request (with at least one first-level, second-level, and third-level signature) to the smart contract implemented in the distributed ledger 108. For example, one of the computing devices 104 at the director's office 120 can send the signed minting request to one of the network nodes 102 that implements the distributed ledger 108. This may include sending a smart contract request to the address of the smart contract (invoking the smart contract) and subscribing to an event stream. In examples, the signed minting request (or its address in the distributed ledger) is passed as a parameter to the smart contract. Upon executing the smart contract (e.g., performing the digital minting according to the smart contract request), the smart contract may initiate an event, which the requesting computing device 104 (at the currency management department 110) listens for. In examples, the smart contract may update (e.g., increase) a scalar value (e.g., in the state of the smart contract) that indicates the total supply of tokens/digital currency. Updating this scalar value may include executing a minting transaction in the distributed ledger 108.

Each of the network nodes 102, computing devices 104, and air-gapped computing device 116 can be implemented as any of a mobile computing device, such as a mobile phone, tablet computer, mobile media device, mobile gaming device, laptop computer, vehicle-based computer, etc.; or a non-mobile device such as a dedicated terminal, a public terminal, a kiosk, a server, or a desktop computer. Each network node 102 and computing device 104 is communicatively coupled to each other using at least one network 106. In examples, the at least one network 106 includes at least one wired network and/or at least one wireless network. In examples, any combination of wired and wireless networks is used to couple the computing devices 104 to the computing device 102. In examples, the at least one network 106 includes at least one of at least one local area network (LAN), at least one wide area network (WAN), or the Internet. In examples, any combination of local area networks, wide area networks, or the Internet is used as the at least one network 106 to couple the computing devices 104 to the computing device 102. In examples, each of the network nodes 102, computing devices 104, and air-gapped computing device 116 includes at least one memory, at least one processor, at least one optional network interface, at least one optional display device, at least one optional input device, and at least one power source.

Figure 2A:
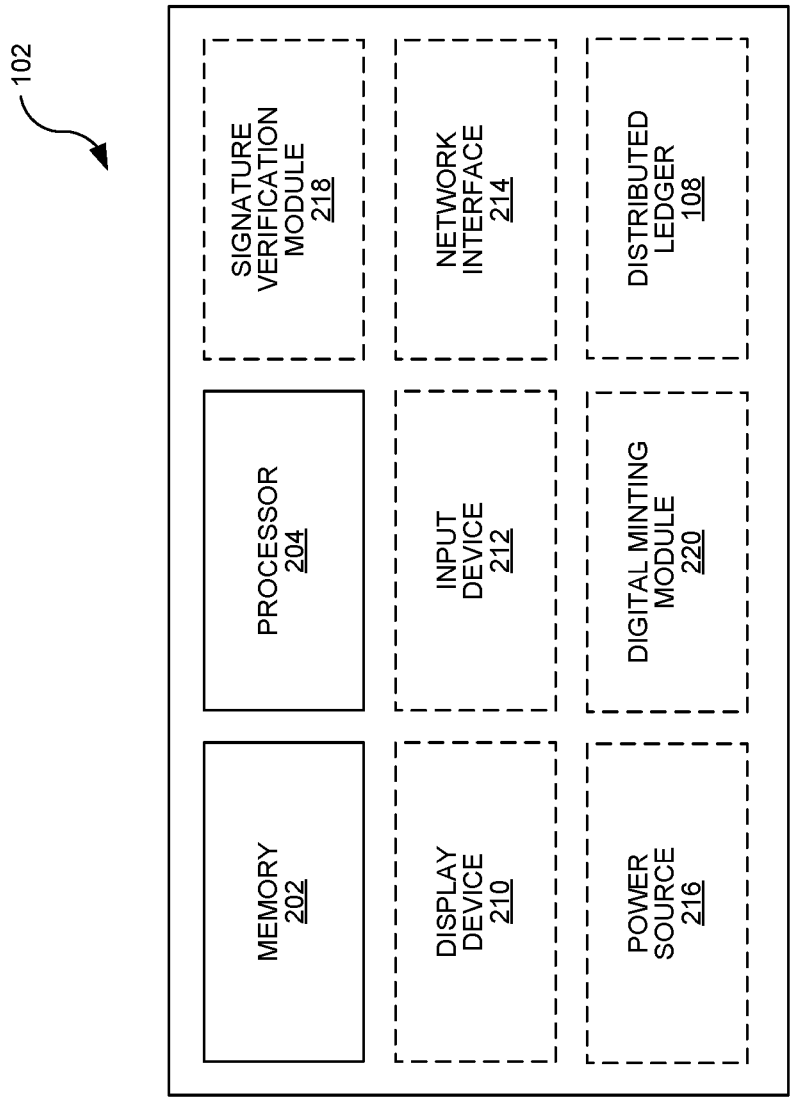
FIG. 2A is a block diagram illustrating an exemplary embodiment of a network node used within a peer-to-peer network.

FIG. 2A is a block diagram illustrating an exemplary embodiment of a network node 102 used within a peer-to-peer network 114. Network node 102 includes at least one memory 202, at least one processor 204, an optional signature verification module 218, an optional at least one display device 210, an optional at least one input device 212, an optional network interface 214, an optional power source 216, an optional digital minting module 220, and an optional copy of the distributed ledger 108. In examples, the network node 102 may receive a smart contract request (with a signed minting request), verifying the signatures on the signed minting request, perform the digital minting as indicated in the signed minting request, and initiate an event indicating approval of the smart contract request (e.g., the digital minting has been performed).

In examples, the at least one memory 202 can be any device, mechanism, or populated data structure used for storing information. In examples, the at least one memory 202 can be or include any type of volatile memory, non-volatile memory, and/or dynamic memory. For example, the at least one memory 202 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like. In accordance with some embodiments, the at least one memory 202 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as the at least one memory 202. The at least one memory 202 may be used to store instructions for running one or more applications or modules on the at least one processor 204. For example, the at least one memory 202 could be used in one or more embodiments to store (1) the distributed ledger 108 and/or (2) all or some of the instructions needed to execute the functionality of the optional signature verification module 218 and/or the optional digital minting module 220.

In examples, the at least one processor 204 can be any known processor, such as a general purpose processor (GPP) or special purpose (such as a field-programmable gate array (FPGA), application-specific integrated circuit (ASIC) or other integrated circuit or circuitry), or any programmable logic device. In examples, the optional signature verification module 218 and/or the optional digital minting module 220 is implemented by the at least one processor 204 and the at least one memory 202.

In examples, the optional at least one display device 210 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 212 include at least one of a touchscreen (including capacitive and resistive touchscreens), a touchpad, a capacitive button, a mechanical button, a switch, a dial, a keyboard, a mouse, a camera, a biometric sensor/scanner, etc. In examples, the optional at least one display device 210 and the optional at least one input device 212 are combined into a human machine interface (HMI) for user interaction with the computing device 104.

In examples, the at least one optional network interface 214 includes or is coupled to at least one optional antenna for communication with a network. In examples, the at least one optional network interface 214 includes at least one of an Ethernet interface, a cellular radio access technology (RAT) radio, a Wi-Fi radio, a Bluetooth radio, or a near field communication (NFC) radio. In examples, the at least one optional network interface 214 includes a cellular radio access technology radio configured to establish a cellular data connection (mobile internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 214 includes a Wi-Fi (IEEE 802.11) radio configured to communicate with a wireless local area network that communicates with the remote server, rather than a wide area network. In examples, the at least one optional network interface 214 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device. In examples, the same at least one optional network interface 214 is also used for communication with an external gateway device to a network (such as an NFC payment terminal).

In examples, at least one optional power source 216 is used to provide power to the various components of the network node 102.

The network node 102 may receive a smart contract request as part of its role implementing the distributed ledger 108 in the peer-to-peer network 114. The request may be sent to an address (e.g., of the smart contract) in the distributed ledger 108. In examples, the smart contract request is received from a computing device 104 in a director's office 120. In examples, at least one (e.g., two) second-level signature and third-level signature are applied to the minting request before being passed as a parameter with the smart contract request (where each minting request includes a currency request with at least one (e.g., two) first level signature).

In examples, each signature is applied using a different private key controlled by a different agent (e.g., employee, contractor, appointed official, elected official, etc.) of a particular institution. Alternatively, more than one agent at a particular level (e.g., first, second, or third) or institution can share a single private key, e.g., multiple agents of a particular financial institution 112 can each have a user account by which they are able to gain access to the private key. In some configurations, the address of the signed minting request (in the distributed ledger 108) is passed as a parameter with the smart contract request (instead of passing the signed minting request itself). In examples, the requesting computing device 104 (e.g., a computing device 104-7 at the director's office 120) may subscribe to an event stream when it sends the smart contract request to the network node 102.

In examples, a central bank can configure the number of levels in the system 100 and/or the number of signatures required at each level. For example, assume a minting request is generated according to the following protocol configured by a central bank: (1) a currency request is signed with a first (first-level) signature using a first individual's private key (first individual is an agent of a financial institution 112); (2) the currency request is optionally signed by a second (first-level) signature using a second individual's private key (second individual is an agent of the same financial institution 112); (3) the (singly- or doubly-) signed currency request is formatted into a minting request, which is signed by a third (second-level) signature using a third individual's private key (third individual is an agent of the currency management department 110); (4) the minting request is optionally signed by a fourth (second-level) signature using a fourth individual's private key (fourth individual is an agent of the currency management department 110); (5) the minting request is signed by a fifth (third-level) signature using a fifth individual's private key (fifth individual is a director-level agent of the central bank 120); and (6) the minting request is optionally signed by a sixth (third-level) signature using a sixth individual's private key (sixth individual is a director-level agent of the central bank 120). Alternatively, more than one currency request (and its signature(s)) can be formatted and packaged into a single minting request. In examples, the first and second individuals are agents of the financial institution 112; the third and fourth individuals are agents of the currency management department 110; and the fifth and sixth individuals are agents of the director's office 120. In examples, the group of agents authorized to act on behalf of the currency management department 110 and the group of agents authorized to act on behalf of the director's office 120 may overlap. However, when multiple signatures are applied at a particular institution, the different signatures will be applied by different agents.

The signature verification module 218 may utilize at least one smart contract to verify signatures. Upon receiving the minting request generated from steps (1)-(7) above, the signature verification module 218 may verify the signatures based on the level at which they were expected to be applied, using the public keys marked as active stored in the distributed ledger 108. For example, the network node 102 may use the reverse order by (1) verifying the sixth signature, if present, using a sixth individual's public key (corresponding to the sixth individual's private key) among a set of third-level public key(s); (2) verifying the fifth signature using a fifth individual's public key (corresponding to the fifth individual's private key) among a set of third-level public key(s); (3) verifying the fourth signature, if present, using a fourth individual's public key (corresponding to the fourth individual's private key) among a set of second-level public key(s); and so one until all the signatures on the minting request and each currency request have been verified. Alternatively, the network node 102 may verify in the same order the signatures were applied in by (1) verifying the first signature using the first individual's public key (corresponding to the seventh individual's private key) among a set of first-level public key(s); (2) verifying the second signature using the second individual's public key (corresponding to the second individual's private key) among a set of first-level public key(s); (3) verifying the third signature, if present, using a third individual's public key (corresponding to the third individual's private key) among a set of second-level public key(s); and so one until all the signatures on the minting request and each currency request have been verified. Alternatively, the signatures may be verified in a random order, e.g., the fifth signature followed by the third signature followed by the sixth signature, etc.

In examples, a digital minting module 220 can perform the digital minting using at least one smart contract. In examples, the digital minting module 220 may update (e.g., increase) a scalar value in the distributed ledger 108 (e.g., in the state of the smart contract) that indicates the total supply of tokens/digital currency. Updating this scalar value may include executing a minting transaction in the distributed ledger 108, e.g., newly-minted tokens are sent to an address belonging to the currency management department 110 (e.g., a governor's currency control gateway wallet), after which the newly-minted tokens are optionally transferred to address(es) belonging to the requesting financial institution(s) 112. Digital minting may also include initiating an event (on an event stream that a requesting computing device 104 is subscribed to) that indicates approval of the smart contract request (e.g., the digital minting has been performed). The requesting computing device 104 may listen for the event indicating approval of the smart contract request.

In optional centralized custodial configurations, the digital minting module 220 may apply a first-level, second-level, and/or third-level signature(s) to a currency request or digital minting request. In examples, the digital minting module 220 may apply first-level signature(s) to currency requests instead of (or in addition to) computing devices 104 at financial institution(s) 112. Additionally or alternatively, the digital minting module 220 may apply second-level signature(s) to minting requests instead of (or in addition to) computing devices 104 at a currency management department 110. Additionally or alternatively, the digital minting module 220 may apply third-level signature(s) to signed minting requests instead of (or in addition to) a computing device 104 or an air-gapped computing device 116 at a director's office 120.

Figure 2B:
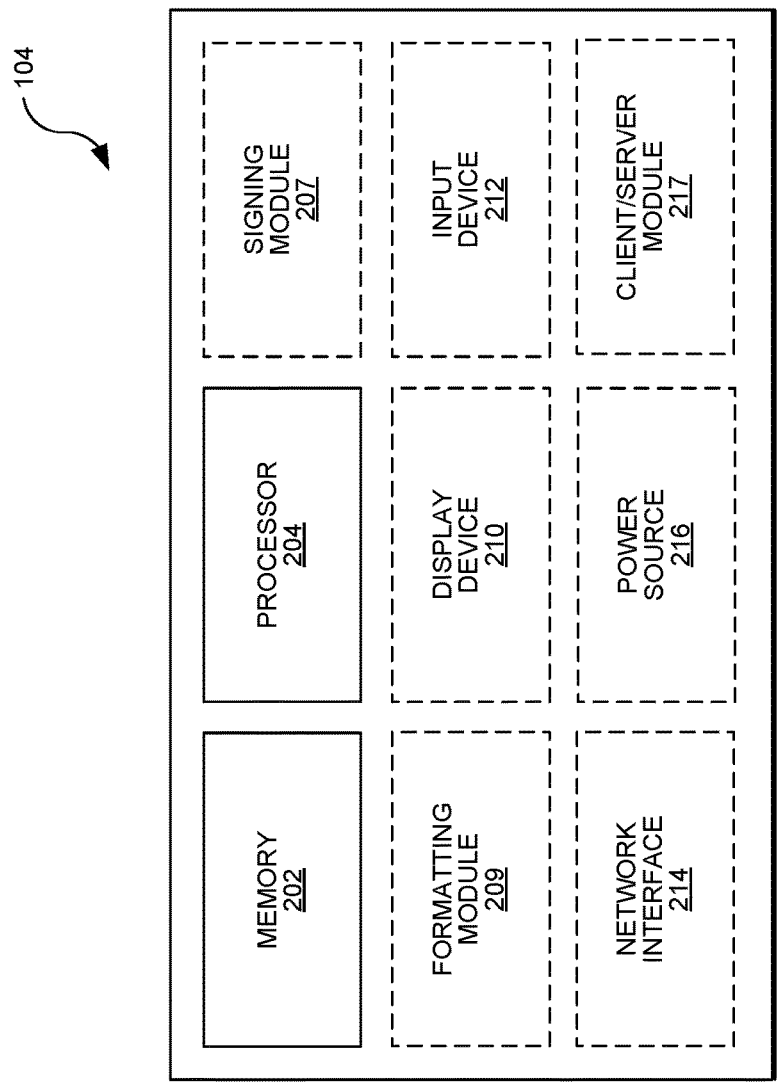
FIG. 2B is a block diagram illustrating an exemplary embodiment of a computing device used by a financial institution or a currency management department during a digital minting process.

FIG. 2B is a block diagram illustrating an exemplary embodiment of a computing device 104 used by a financial institution 112 or a currency management department 110 during a digital minting process. The computing device 104 includes at least one memory 202, at least one processor 204, an optional at least one display device 210, an optional at least one input device 212, an optional network interface 214, and an optional power source 216, which operate according to similar principles and methods as those described in conjunction with the network node 102 in FIG. 2A.

Additionally, the computing device 104 may include a signing module 207. In some configurations, at least one agent of a financial institution 112 applies a first-level signature to a currency request using at least one private key. One or more signed currency requests may be recorded on a distributed ledger 108 (and/or off-ledger) and downloaded to the currency management department 110; formatted into a minting request. In some configurations, a minting request is only generated in response to a particular currency request if the central bank does not have enough digital currency reserve to meet the needs of the currency request. If the central bank has enough digital currency reserves, a minting request is not generated. If the central bank does not have enough digital currency reserves, a minting request is generated for the currency request.

If generated, a minting request may be signed by at least one agent of the currency management department 110 using at least one computing device 104. Accordingly, computing devices 104 at financial institution(s) 112, the currency management department 110 may include a signing module 207. In examples, the signing module 207 can apply a signature to a payload of data by: (1) using a cryptographic hashing function on the payload to produce a hash/digest of the payload; (2) encrypting the hash/digest with the private key of an individual; and (3) appending the encrypted hash/digest to the payload. In examples, subsequent (non-first) signature(s) may hash and encrypt an earlier signature and the payload again, e.g., subsequent signature(s) may be considered "enveloped" (or "nested") signature(s).

When implemented at a currency management department 110, the computing device 104 may also include an optional formatting module 209 that formats the (singly- or doubly-) signed currency request(s) from the financial institution(s) 112 into a minting request. In examples, the currency request(s) are formatted into JavaScript Object Notation (JSON) representations (or other formatting protocol, such as XML, a binary string, a string, a text file, etc.) that each include one or more currency requests and their nested signatures. In examples, one or more additional signatures can be applied to the JSON minting request at the currency management department 110.

Additionally, the computing device 104 can optionally include a client/server module 217. The client/server module 217 may implement client and/or server functionality to enable the computing device 104 to communicate via at least one network 106. When the computing device 104 is implemented at a financial institution, the client/server module 217 may implement at least some web browser functionality that submits commands to a server (e.g., another computing device 104) to receive, store, perform cryptographic and/or other functions on a currency request. When the computing device 104 is implemented at a currency management department 110, the client/server module 217 may implement at least some web browser functionality that submits commands to a server (e.g., another computing device 104) to receive, store, and/perform cryptographic and/or other functions on a minting request.

Figure 2C:
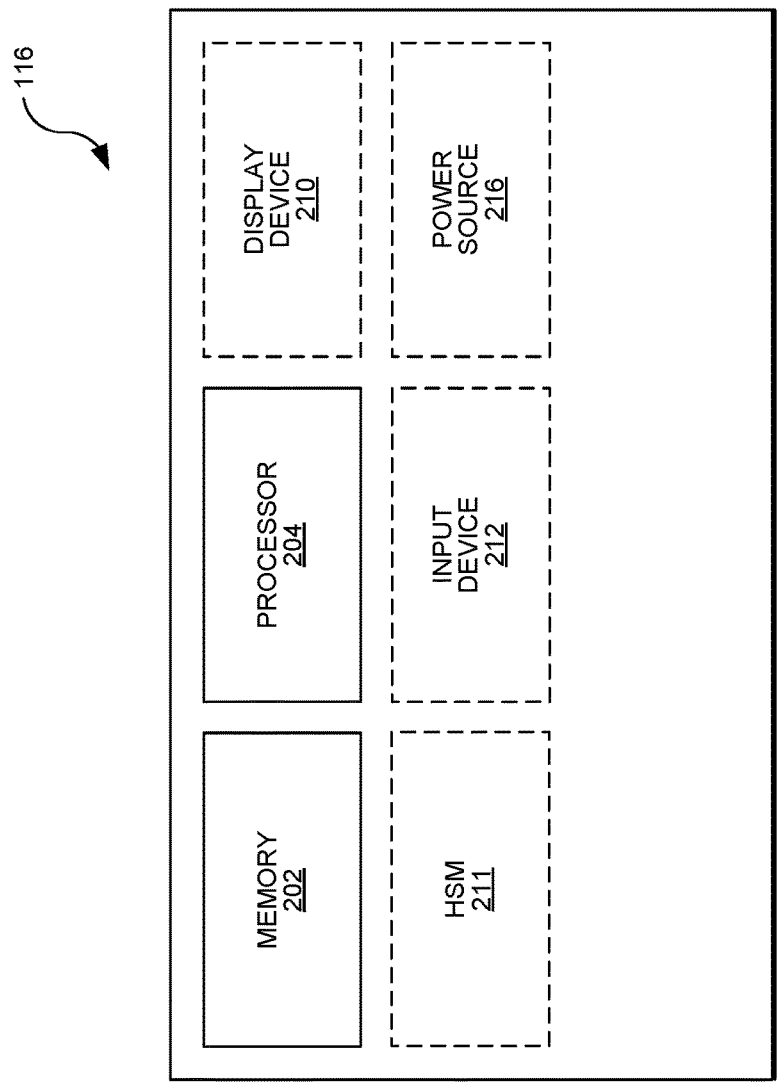
FIG. 2C is a block diagram illustrating an exemplary embodiment of an air-gapped computing device used by a director's office during a digital minting process.

FIG. 2C is a block diagram illustrating an exemplary embodiment of an air-gapped computing device 116 used by a director's office 120 during a digital minting process. The air-gapped computing device 116 includes at least one memory 202, at least one processor 204, an optional at least one display device 210, an optional at least one input device 212, an optional network interface 214, and an optional power source 216, which operate according to similar principles and methods as those described in conjunction with the network node 102 and the computing device 104 in FIGS. 2A-2B.

It should be noted, however, that the air-gapped computing device 116 does not have any network interfaces 214. For example, the air-gapped computing device 116 does not have any wireless radios (e.g., no Wi-Fi, Bluetooth, cellular, WAN, etc.) or other network access to other computers (e.g., LAN), but may have removable storage drives or ports.

A JSON minting request may be downloaded at a computing device 104-7 at a director's office 120 and optionally taken via removable storage (e.g., a USB drive) to an air-gapped computing device 116 that utilizes a hardware security module (HSM) for applying third-level signature(s) to the JSON minting request. Accordingly, the HSM 211 may be an HSM (e.g., a card inserted in the air-gapped computing device 116)) and/or may communicate with an external HSM that is communicatively coupled to the air-gapped computing device 116. In examples, a computing device (e.g., the air-gapped computing device 116) may also verify signature(s) applied at the currency management department 110 and/or the financial institution(s) 112, using copies of active public key(s) 348 previously downloaded from the distributed ledger 108 (e.g., bundled on a USB drive with the JSON minting request), before any third-level signatures are applied. Following the application of third-level signature(s) at the air-gapped computing device 116, the signed minting request is taken back online (e.g., via a removable storage to a networked computing device 104-7 at the director's office 120) and stored in the distributed ledger 108.

Figure 3A:
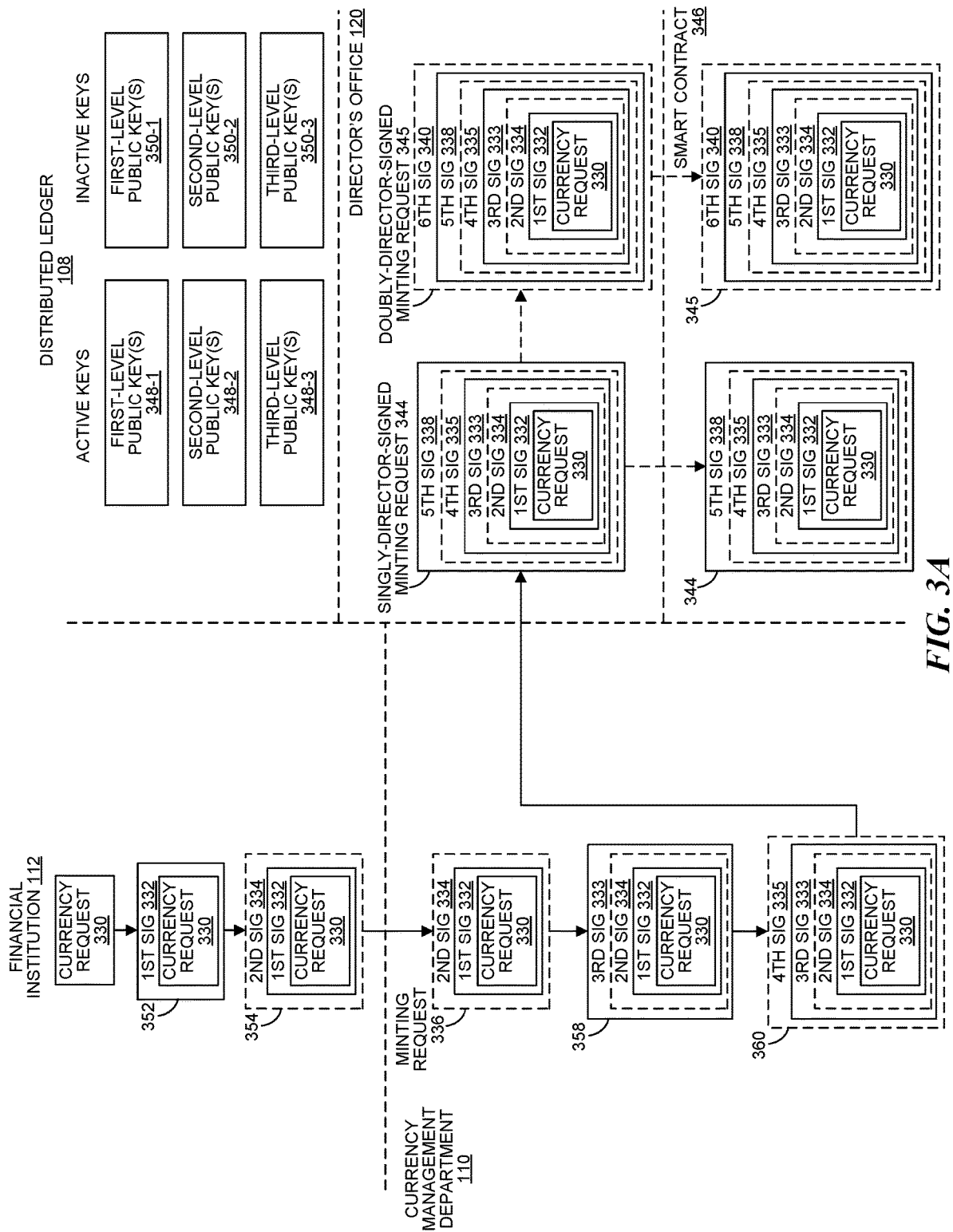
FIG. 3A is a block diagram illustrating an exemplary configuration of a minting request being generated, signed, and verified.

FIG. 3A is a block diagram illustrating an exemplary configuration of a minting request 336 being generated, signed, and verified. In examples, the minting request is generated in a system 100 with a peer-to-peer network 114 that includes a plurality of network nodes 102 (each implementing a distributed ledger 108), a financial institution 112, a currency management department 110 (with one or more computing devices 104), and a director's office 120 (with at least one computing device and optionally an air-gapped computing device 116). Where an action is illustrated in FIG. 3A as being performed at an institution, it could involve one or more computing devices 104 owned and/or operated by the institution.

A currency request 330, which indicates a request for more digital currency to be sent to the financial institution 112, may be generated at a financial institution 112. In examples, the currency request 330 may be generated based on various conditional logic used by the financial institution 112, e.g., in order to comply with various applicable laws, rules, and/or regulations. In examples, the currency request 330 is generated using a computing device 104 and may include any of the following fields: (1) an amount of digital currency (e.g., tokens) requested by the financial institution 112; (2) a time stamp indicating when the currency request 330 is being generated; and/or (3) an ID of the requester that generated the currency request 330. Optionally, the currency request 330 may be recorded on a distributed ledger 108 after which at least one first-level signatures are recorded in the distributed ledger 108 without re-recording the currency request 330 in the distributed ledger 108. Alternatively, if the currency request is instead a request for digital non-currency assets to be created (e.g., a software program, a digital movie, digital music, a video game, achievements within a video game ecosystem (a weapon, achievement, costume, etc.), the request may include the number of digital assets requested to be created.

If the unsigned currency request 330 is recorded on a distributed ledger 108, it is retrieved before signing. Alternatively, the currency request 330 may be stored at the first financial institution 112. After retrieval, at least one first-level signature is applied to the currency request 330 at least one individual. In examples, the currency request 330 is signed with a first signature 332 using a first individual's private key, where the first individual is an agent of the financial institution 112. In examples, the first signature 332 is applied by (1) cryptographically hashing the currency request 330 (the payload) to produce a hash/digest; (2) encrypting the hash/digest with the private key of the first individual; and (3) appending the encrypted hash/digest (the first signature 332) to the currency request 330 (the payload). Following the addition of a first signature 332, a currency request 330 can be referred to as "singly-signed" and may be recorded in the distributed ledger 108.

Optionally, a second signature 334 is also applied to the singly-signed currency request 352 using a second individual's private key, where the second individual is also an agent of the financial institution 112. In examples where the singly-signed currency request 352 is recorded in the distributed ledger 108, applying the second signature 334 may include retrieving the singly-signed currency request 352 from the distributed ledger 108. In examples, the second signature 334 is applied by (1) cryptographically hashing the payload (the currency request 330 and the first signature 332) to produce a hash/digest; (2) encrypting the hash/digest with the private key of the second individual; and (3) appending the encrypted hash/digest (the second signature 334) to the first signature 332 (the payload). In examples, the first signature 332 is applied by the same or different computing device 104 as the second signature 334, both owned and/or operated by the same financial institution 112. Following application of the optional second signature 334 at the financial institution 112, the currency request 330 may be referred to as "doubly-signed". Optionally, the doubly-signed currency request 354 may be recorded in the distributed ledger 108.

In examples, after a private key is generated, the public key (associated with the private key) can be placed into the distributed ledger 108 and designated as an "active" key. Additionally, each active public key 348 may be designated as a first-level public key 348-1 (intended to verify signatures applied at a financial institution 112), a second-level public key 348-2 (intended to verify signatures applied at a currency management department 110), or a third-level public key 348-3 (intended to verify signatures applied at a director's office 120). In examples, the active keys 348 in the distributed ledger 108 can be rotated at which point the previously-active key is now designated as "previous" or "inactive". The previous/inactive keys 350 are still stored in the distributed ledger 108 (to prove historical minting requests went through the appropriate verification). However, in examples, signatures on a non-expired minting request may be verified using only active public keys 348 in the distributed ledger 108.

Public keys 348, 350 can be designated as active or inactive using any suitable means. In examples, at least one of the following may be used to indicate active or inactive status of a public key on the distributed ledger: (1) an explicit value in a key/value pair, where the key is an active public key 348 and the value is a Boolean indicating either active or inactive; or (2) a time to live (TTL) after which the active public key 348 is designated as an inactive public key 350. In some configurations, the private key(s) (and their corresponding public key(s) on the distributed ledger) for a particular level can be rotated in response to (1) one of the private keys being compromised and/or (2) the TTL of a public key expires.

The rotation and/or expiration periods may be staggered so they are not all rotated at once, e.g., based on the institution. In examples, (1) the first-level private key(s) of the financial institutions 112 (and their corresponding first-level public key(s) 348-1) can be rotated in January, April, July, and October; (2) the second-level private key(s) of the currency management department 110 (e.g., and their corresponding the second-level public key(s) 348-2) can be rotated in February, May, August, and November; and (3) the third-level private key(s) used to sign at the air-gapped computing device 116 (e.g., and their corresponding the third-level public key(s) 348-3) can be rotated in March, June, September, and December.

Figure 5:
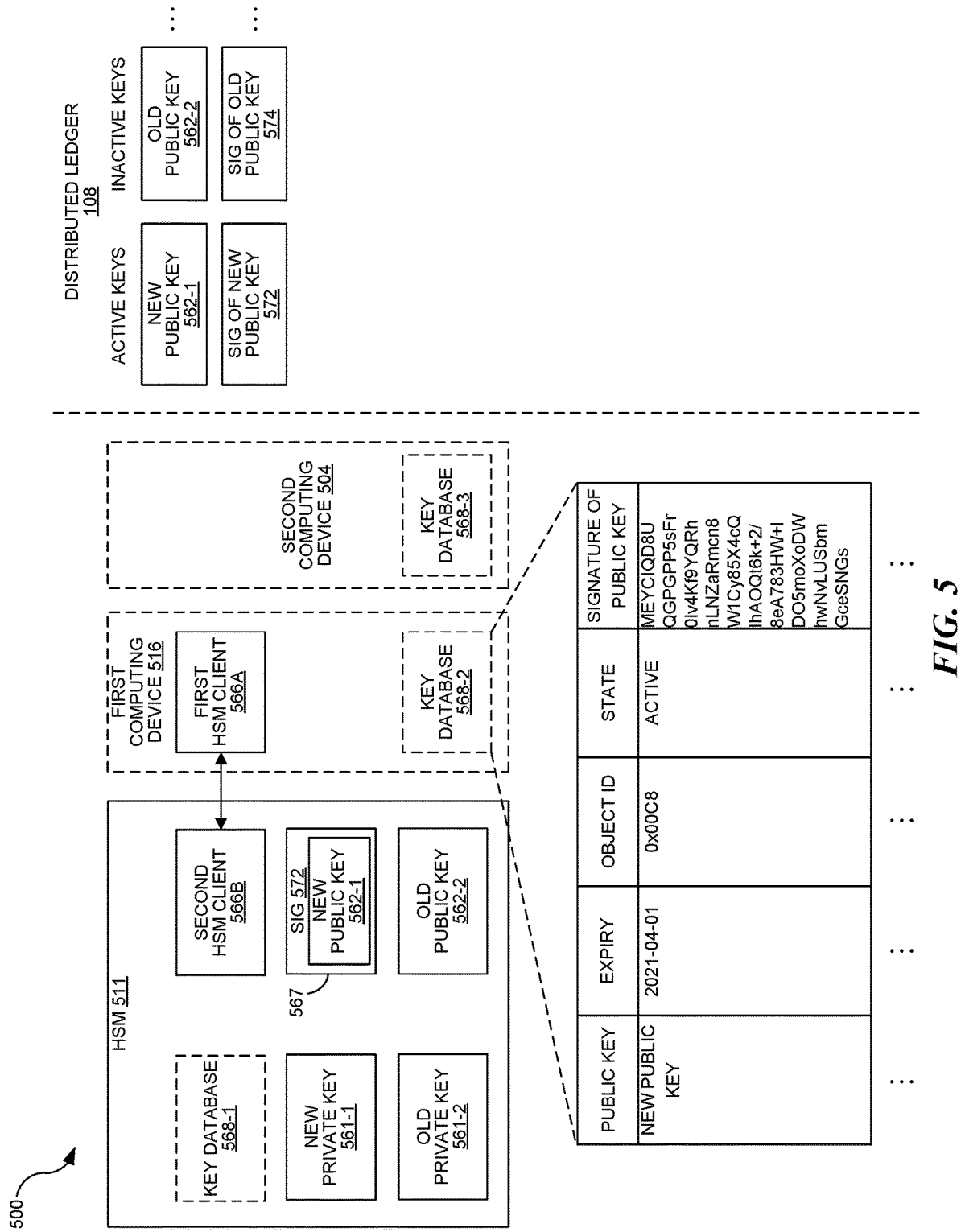
FIG. 5 is a block diagram illustrating a system for key rotation that may be used with the present disclosure.

In examples, a new public key 348, 350 can be stored on the distributed ledger 108 using a transaction (separate from any ledger transactions associated with a currency request 330) when the previously-active public key 348 is being rotated. In examples, the new public key 348, 350 is signed to produce a signature that is also sent as part of the transaction and stored on the distributed ledger 108. In other words, the payload of the transaction can be the new public key 348, 350, in which case the transaction signature is a signature of the new public key 348, 350. In examples, the new public key 348, 350 (serving as the transaction payload) is signed with the private key corresponding to the previously-active public key 348 that is being rotated. Specific example configurations of key rotation are illustrated in FIG. 5 and associated description below.

The singly-signed currency request 352 or doubly-signed currency request 354 may then be retrieved (e.g., from the distributed ledger 108) by a computing device 104 at a currency management department 110 for further signatures. The singly-signed currency request 352 or doubly-signed currency request 354 is formatted into a respective minting request 336. In some configurations, a minting request 336 is only generated in response to a particular currency request if the central bank does not have enough digital currency reserve to meet the needs of the currency request 330. If the central bank has enough digital currency reserves, a minting request 336 is not generated. If the central bank does not have enough digital currency reserves, a minting request 336 is generated for the currency request 330.

If generated, the minting request 336 may be formatted into a JavaScript Object Notation (JSON) representation (or other formatting protocol, such as XML) that includes the currency request 330 and signature(s) applied at the financial institution 112. Alternatively, the singly-signed currency request 352 or doubly-signed currency request 354 can be formatted into a JSON representation (or XML representation) by the financial institution 112 before recording in the distributed ledger 108.

In examples, the minting request 336 is validated before signing. Validating may include verifying a JSON signature on the minting request 336 using a public key stored in the distributed ledger 108; and/or verifying that the minting request 336 is not expired (e.g., the current time is not greater than the expiration time in the minting request 336).

If successfully validated, at least one second-level signature may be applied to the minting request 336. In examples, the minting request 336 is signed with a third signature 333 using a third individual's private key, where the third individual is an agent of the currency management department 110. In examples, the third signature 333 is applied by: (1) cryptographically hashing the minting request 336 (the payload) to produce a hash/digest; (2) encrypting the hash/digest with the private key of the third individual; and (3) appending the encrypted hash/digest (the third signature 333) to the minting request 336 (the payload). The singly-signed minting request 358 may optionally be recorded in the distributed ledger 108.

Optionally, a fourth signature 335 is also applied using a fourth individual's private key, where the fourth individual is also an agent of the currency management department 110. In examples where the singly-signed minting request 358 is recorded in the distributed ledger 108, applying the fourth signature 335 may include retrieving the singly-signed minting request 358 from the distributed ledger 108. In examples, the fourth signature 335 is applied by (1) cryptographically hashing the third signature 333 (the payload) to produce a hash/digest; (2) encrypting the hash/digest with the private key of the fourth individual; and (3) appending the encrypted hash/digest (the fourth signature 335) to the third signature 333 (the payload). The doubly-signed minting request 360 may optionally be recorded in the distributed ledger 108.

In addition to adding the third signature 333 and the optional fourth signature 335, any of the following fields may be added (at the currency management department 110) to the minting request 336: (1) the total amount of digital currency (e.g., DXCD) to mint; (2) time stamp (e.g., based on an HLF time or other single source of truth/master clock; (3) an approver ID (e.g., which can be traced to a username); and/or (4) an expiration time (or Time To Live (TTL)) after which the minting request 336 expires. In examples, the time stamp is based on the time kept by the network nodes 102, e.g., a clock on a computing device 104 (at the currency management department 110) that is synchronized to a master clock kept by the network nodes 102.

The singly-signed minting request 358 or the doubly-signed minting request 360 may downloaded by a computing device 104-7 at a director's office 120. Optionally, the singly-signed minting request 358 or the doubly-signed minting request 360 is validated before signing. Validating may include (1) verifying signature(s) applied at the currency management department 110 and/or the financial institution(s) 112 using active public key(s) 348 stored in the distributed ledger 108; and/or (2) verifying that the minting request 336 is not expired (e.g., the current time is not greater than the expiration time in the minting request 336). Optionally, the computing device 104-7 at the director's office 120 may apply a signature (before the singly-signed minting request 358 or the doubly-signed minting request 360 is transported to the air-gapped computing device 116).

If successfully validated, the singly-signed minting request 358 or the doubly-signed minting request 360 may be optionally transported via removable storage (e.g., a USB drive) to an air-gapped computing device 116. In examples, a computing device (e.g., the air-gapped computing device 116) may also verify signature(s) applied at the currency management department 110 and/or the financial institution(s) 112, using copies of active public key(s) 348 previously downloaded from the distributed ledger 108 (e.g., bundled on a USB drive with the JSON minting request), before the air-gapped computing device applies any signatures.

In examples, a hardware security module (HSM) may be attached to the air-gapped computing device 116 to apply at least one third-level signature. In examples, the HSM also generates and/or manages at least one private key described herein. It should be noted that HSM(s) may be utilized to apply signatures at any of the institutions herein (e.g., financial institution(s) 112, currency management department 110, or director's office 120), not just when an air-gapped computing device 116 applies a third-level signature at a director's office 120.

In examples, a fifth signature 338 is applied using a fifth individual's private key, where the fifth individual is also an agent of the currency management department 110. In examples, the fifth individual is a director-level agent of the currency management department 110. In examples, the fifth signature 338 is applied by (1) cryptographically hashing the singly-signed minting request 358 or the doubly-signed minting request 360 (the payload) to produce a hash/digest; (2) encrypting the hash/digest with the private key of the fifth individual; and (3) appending the encrypted hash/digest (the fifth signature 338) to the singly-signed minting request 358 or the doubly-signed minting request 360 (the payload). After application of the fifth signature 338, the minting request is a singly-director-signed minting request 344.

Optionally, a sixth signature 340 is also applied to the singly-director-signed minting request 344 by (1) cryptographically hashing the singly-director-signed minting request 344 (the payload) to produce a hash/digest; (2) encrypting the hash/digest with the private key of the sixth individual; and (3) appending the encrypted hash/digest (the sixth signature 340) to the singly-director-signed minting request 344 (the payload). After application of the sixth signature 340, the minting request is a doubly-director-signed minting request 345. Following signing at the air-gapped computing device 116, the singly-director-signed minting request 344 or doubly-director-signed minting request 345 is taken back online (e.g., back to a computing device 104-7 connected to at least one network 106) and sent to a smart contract 346 (chaincode) for verification and digital minting. The singly-director-signed minting request 344 or doubly-director-signed minting request 345 may also be referred to as a "stock result".

In some configurations, the smart contract 346 may verify the enveloped (or nested) signatures in the same or reverse order that the signatures were applied in (or another order) based on the level at which the respective signature was expected to be applied. The smart contract 346 may verify each signature in the singly-director-signed minting request 344 or doubly-director-signed minting request 345 ("stock result") using an active public key 348 stored in the distributed ledger 108 as of the time of the respective signature. In examples, the smart contract 346 may verify the first signature 332 and optional second signature 334 using the first-level public key(s) 348-1 recorded in the distributed ledger 108; verify the third signature 333 and optional fourth signature 335 using the second-level public key(s) 348-2 recorded in the distributed ledger 108; and verify the fifth signature 338 and optional sixth signature 340 using the third-level public key(s) 348-3 recorded in the distributed ledger 108. This may include attempting to verify each signature by iteratively using each public key 348 in the respective group of public key(s) 348. If none of the public key(s) 348 at an expected level will verify the signature, the signature does not verify, e.g., the public key(s) 348 from other, non-expected levels are not used. For example, if a first signature is being verified, which is expected to be applied at a financial institution 112, the smart contract 346 may attempt to verify the first signature against each of the first-level public key(s) 348-1 until one of the first-level public key(s) 348-1 successfully verifies the first signature or all the first-level public key(s) 348-1 have been tried. If all first-level public key(s) 348-1 have been tried and none verify the first signature, the smart contract request including the first signature is rejected without trying to verify the signature using the second-level public key(s) 348-2 or the third-level public key(s) 348-3.

Accordingly, even if a malicious actor got the same private keys, but didn't know the institution that the signatures were applied at, a fraudulent director-signed minting request wouldn't verify correctly because the smart contract 346 would have to verify each signature against the correct level. For example, if the first signature 332, added by a malicious actor, used a private key of a director or CMD 110 agent, the smart contract 346 wouldn't verify the signature because the corresponding public key would not be in the first-level public key(s) 348-1. Similarly, if the third signature 333, added by a malicious actor, used a private key of a director or an agent of a financial institution 112, the smart contract 346 wouldn't verify the signature because the corresponding public key would not be in the second-level public key(s) 348-2. Similarly, if the fifth signature 338, added by a malicious actor, used a private key of an agent of a financial institution 112 or CMD 110, the smart contract 346 wouldn't verify the signature because the corresponding public key would not be in the third-level public key(s) 348-3.

In examples, a signature may be verified by: (1) decrypting the signature (appended, encrypted hash) with an active public key 348 corresponding to the private key used for signing; (2) hashing the payload; and (3) comparing the decrypted signature (from (1)) with the hash (from (2)) to determine if both are the same. If both are the same, the signature is verified. If not, the signature is not verified.

Figure 3B:
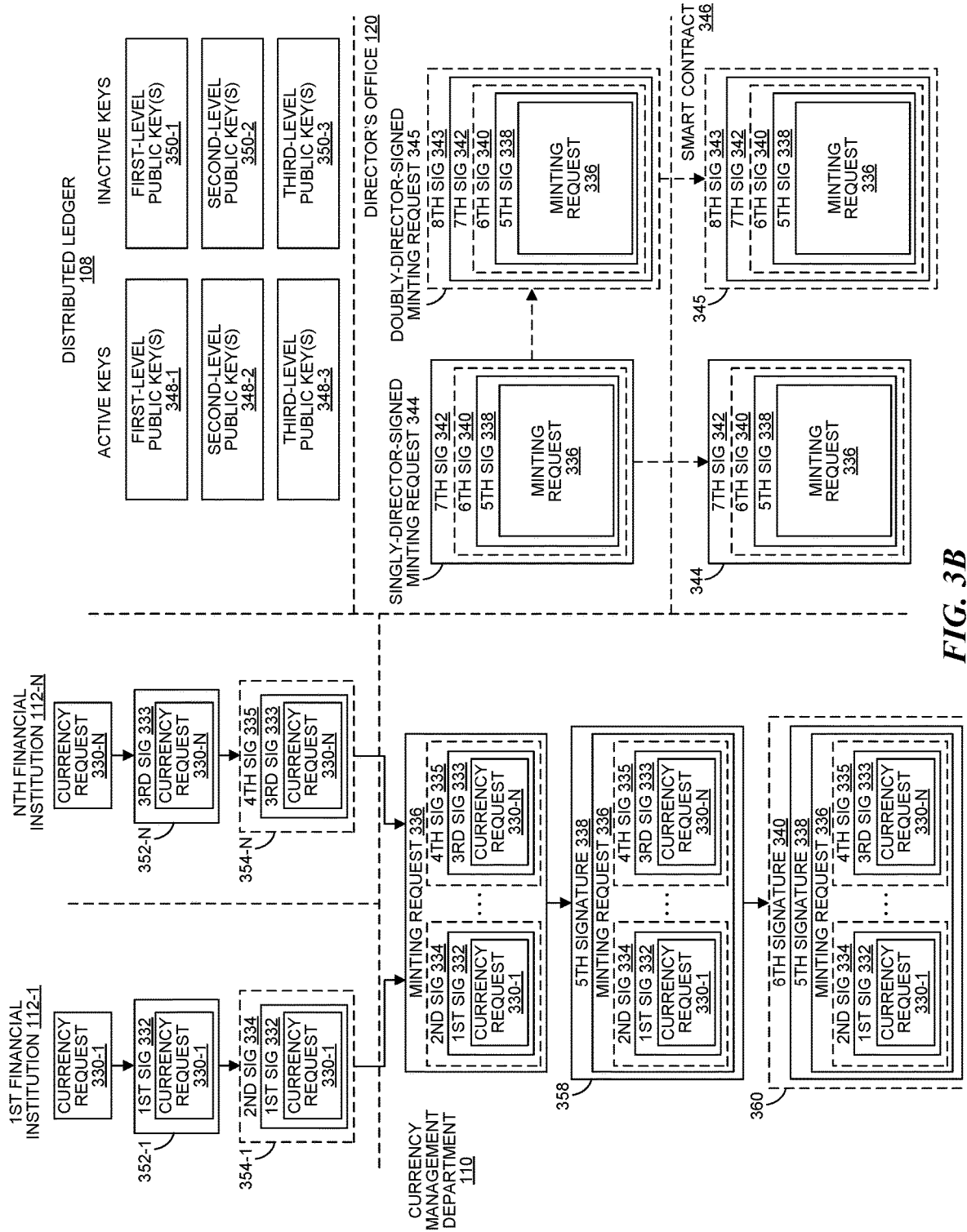
FIG. 3B is a block diagram illustrating another exemplary configuration of a minting request being generated, signed, and verified

FIG. 3B is a block diagram illustrating another exemplary configuration of a minting request 336 being generated, signed, and verified. In examples, the minting request 336 is generated in a system 100 with a peer-to-peer network 114 that includes a plurality of network nodes 102 (each implementing a distributed ledger 108), N financial institutions 112 (each with one or more computing devices 104), a currency management department 110 (with one or more computing devices 104), and a director's office 120 (with at least one computing device 104 and optionally an air-gapped computing device 116). Where an action is illustrated in FIG. 3B as being performed at an institution, it could involve one or more computing devices 104 owned and/or operated by the institution. The configuration of FIG. 3B may include many similar institutions and data as the configuration of FIG. 3A. Unless otherwise noted, the techniques in FIG. 3B operate according to similar principles and methods as those described in conjunction with the configuration of FIG. 3A.

Unlike FIG. 3A, each of N financial institutions 112 may generate a currency request 330, and at least one first-level signature applied to each currency request 330. For example, a first currency request is signed with a first signature 332 using a first individual's private key, where the first individual is an agent of the first financial institution 112-1. Optionally, the singly-signed currency request 352 is also signed with a second signature 334 using a second individual's private key, where the second individual is also an agent of the first financial institution 112-1.

A similar process may be performed at each of N (N>=1) financial institutions 112. In examples, an Nth currency request 330 (generated at the Nth financial institution 112-N) is: (1) signed with a third signature 333 using a third individual's private key, where the third individual is an agent of the Nth financial institution 112-N; and (2) optionally signed with a fourth signature 335 using a fourth individual's private key, where the fourth individual is an agent of the Nth financial institution 112-N. In examples, each of the N resulting currency requests 330 and its signature(s) are different than every other currency request 330 and its signatures.

In examples, after a private key is generated, the public key (associated with the private key) can be placed into the distributed ledger 108 and designated as an "active" key, e.g., the public key can have an explicit indicator that indicates it is active. In examples, each active public key 348 may have a time to live (TTL) after which is designated as an inactive public key 350. In examples, each active public key 348 may be designated as a first-level public key 348-1 (intended to verify signatures applied at a financial institution 112), a second-level public key 348-2 (intended to verify signatures applied at a currency management department 110), or a third-level public key 348-3 (intended to verify signatures applied at a director's office 120).

Unlike FIG. 3A where each (singly- or doubly-) signed currency request 330 is placed in its own minting request, N singly-signed currency request(s) 352 or doubly-signed currency request(s) 354 may then be combined and formatted into a singly minting request 336 in FIG. 3B. In examples, the minting request 336 is formatted into a JavaScript Object Notation (JSON) representation (or other formatting protocol, such as XML) that includes N singly-signed currency request(s) 352 or doubly-signed currency request(s) 354 from N financial institutions 112.

At least one second-level signature is also applied to the minting request 336 at the currency management department 110. In examples, the minting request 336 is signed with a fifth signature 338 using a fifth individual's private key, where the fifth individual is an agent of the currency management department 110 (to create a singly-signed minting request 358). Optionally, a sixth signature 340 is also applied using a sixth individual's private key, where the sixth individual is also an agent of the currency management department 110 (to create a doubly-signed minting request 360).

The singly-signed minting request 358 or doubly-signed minting request 360 may be optionally transported via removable storage (e.g., a USB drive) to an air-gapped computing device 116 (at a director's office 120). In examples, a hardware security module (HSM) may be attached to the air-gapped computing device 116 to apply at least one third-level signature. In examples, a seventh signature 342 is applied using a seventh individual's private key, where the seventh individual is a director-level agent of the director's office 120 (to produce a singly-director-signed minting request 344). Optionally, an eighth signature 343 is also applied using an eighth individual's private key, where the eighth individual is also a director-level agent of the director's office 120 (to produce a doubly-director-signed minting request 345).

In some configurations, the smart contract 346 may verify the nested signatures in the same order or reverse order that the signatures were applied in (or any other order). In other words, the smart contract 346 may verify each signature in the singly-director-signed minting request 344 or doubly-director-signed minting request 345 ("stock result") using an active public key 348 stored in the distributed ledger 108 as of the time of the respective signature, e.g., the first signature 332, optional second signature 334, third signature 333, and optional fourth signature 335 are verified using the first-level public key(s) 348-1; the fifth signature 338 and optional sixth signature 340 are verified using the second-level public key(s) 348-2; and the seventh signature 342 and optional eighth signature 343 are verified using the third-level public key(s) 348-3. In examples, even though the signatures can be verified in any order, all first-level signatures must be applied before all second-level signatures and all second-level signatures must be applied before all third-level signatures.

Figure 4A:
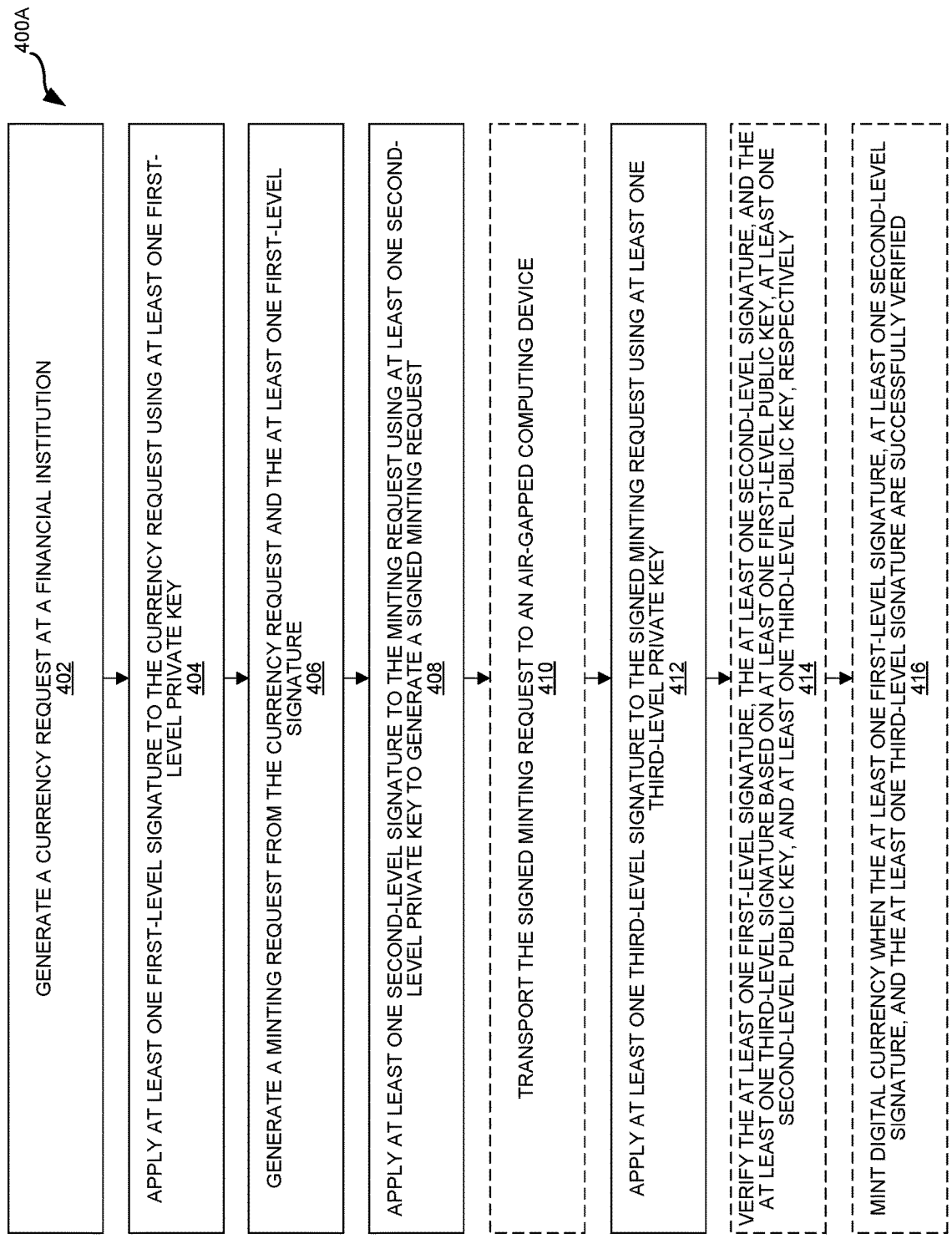
FIG. 4A is a flow diagram illustrating an exemplary method for generating a minting request.

FIG. 4A is a flow diagram illustrating an exemplary method 400A for generating a minting request 336. The method 400A may be performed in a system 100 with: (1) a financial institution 112 using at least one computing device 104 to generate and apply first-level signature(s) to currency requests 330; (2) a currency management department 110 that uses at least one computing device 104 to generate and apply second-level signature(s) to minting requests 336; (3) at least one director's office 120, each with at least one computing device and an optional air-gapped computing device 116 communicatively coupled to an HSM for applying third-level signature(s) to signed minting requests 358, 360; and (4) a peer-to-peer network 114 of network nodes 102, each storing a copy of the distributed ledger 108, and optionally executing smart contracts implemented in the distributed ledger 108. Any of the data (or a hash of the data) at each stage of the method 400A (e.g., following generation and/or signing of the data) may optionally be recorded in the distributed ledger 108 where it's always visible in the transaction history.

The method 400A begins at step 402 where a computing device 104 at a financial institution 112 generates a currency request 330. In examples, each currency request 330 can include an amount of currency requested, a time stamp the currency request was generated, and/or an ID of the requesting financial institution 112. The currency request 330 may be recorded in the distributed ledger 108 upon generation.

The method 400A proceeds at step 404 where at least one first-level signature is applied to the currency request 330 using at least one first-level private key, e.g., at the financial institution 112. In examples, a first signature 332 may be applied by hashing the currency request 330, encrypting the hash with a first private key, and attaching the encrypted hash to the currency request 330. The singly-signed currency request 352 may optionally be recorded in the distributed ledger 108. Optionally, a second signature 334 may be applied by hashing the payload (the currency request 330 and the first signature 332), encrypting the hash with a second private key, and attaching the encrypted hash to the payload (the currency request 330 and the first signature 332). The doubly-signed currency request 354 may optionally be recorded in the distributed ledger 108. In examples, the first-level signature(s) are added to the currency request 330, which is already on in the distributed ledger 108, by simply recording the first-level signature(s) on the distributed ledger 108 (instead of downloading the currency request 330 and re-recording it in the distributed ledger 108).

The first signature 332 and the optional second signature 334 are "first-level" signatures because they are applied at the financial institution 112. The first private key and the optional second private key are "first-level" private keys because they belong to agents of the financial institution 112. The first-level private key(s) correspond to first-level public key(s) 348-1 in the distributed ledger 108.

The method 400A proceeds at step 406 where a minting request 336 is generated from the currency request 330 and the at least one first-level signature. In examples, the minting request 336 is formatted into a JavaScript Object Notation (JSON) representation (or other formatting protocol, such as XML). In examples, step 406 can be performed at a currency management department 110 or the financial institution 112 that generated the currency request 330. In some configurations, a minting request 336 is only generated in response to a particular currency request if the central bank does not have enough digital currency reserve to meet the needs of the currency request 330. If the central bank has enough digital currency reserves, a minting request 336 is not generated. If the central bank does not have enough digital currency reserves, a minting request 336 is generated for the currency request 330.

In examples, the minting request 336 may include any of the following fields: (1) the total amount of digital currency (e.g., DXCD) to mint; (2) a time stamp (e.g., based on an HLF time or other single source of truth/master clock; (3) an approver ID (e.g., which can be traced to a username); and/or (4) an expiration time (or Time To Live (TTL)) after which the minting request 336 expires. In examples, the time stamp is based on the time kept by the network nodes 102, e.g., a clock on a computing device 104 (at the currency management department 110) that is synchronized to a master clock kept by the network nodes 102.

The method 400A proceeds at step 408 where at least one second-level signature is applied to the minting request 336 using at least one second-level private key (e.g., at the currency management department 110) to generate a signed minting request. In examples, a third signature 333 may be applied by hashing the minting request 336, encrypting the hash with a third private key, and attaching the encrypted hash to the minting request 336. The singly-signed minting request 358 may optionally be recorded in the distributed ledger 108. Optionally, a fourth signature 335 may be applied by hashing the payload (the minting request 336 and the third signature 333), encrypting the hash with a fourth private key, and attaching the encrypted hash to the payload (the minting request 336 and the third signature 333). The doubly-signed minting request 360 may optionally be recorded in the distributed ledger 108. In examples, the second-level signature(s) are added to the minting request 336, which is already on in the distributed ledger 108, by simply recording the second-level signature(s) on the distributed ledger 108 (instead of downloading the minting request 336 and re-recording it in the distributed ledger 108).

The third signature 333 and the optional fourth signature 335 are "second-level" signatures because they are applied at the currency management department 110. The third private key and the optional fourth private key are "second-level" private keys because they belong to agents of the currency management department 110. The second-level private key(s) correspond to second-level public key(s) 348-2 in the distributed ledger 108.

In some configurations, a computing device 104-7 at the currency management department 110 is required to verify the at least one first-level signature (using the first-level public key(s) 348-1) before the at least one second-level signature is applied.

The method 400A proceeds at optional step 410 where the signed minting request 336 (e.g., the singly-signed minting request 358 or doubly-signed minting request 360) is transported to an air-gapped computing device 116, e.g., at a director's office 120. This may include using a networked computing device 104-7 to store the signed minting request 336 on removable storage (e.g., a USB drive), then inserting the removable storage into the air-gapped computing device 116. Alternatively, if an air-gapped computing device 116 is not used, optional step 410 is skipped and the method proceeds from step 408 to step 412.

The method 400A proceeds at step 412 where at least one third-level signature is applied to the signed minting request 336 (e.g., the singly-signed minting request 358 or doubly-signed minting request 360) using at least one third-level private key. In examples, the at least one signature is applied at the air-gapped computing device 116 or other computing device 104-7 at a director's office 120. In examples, a fifth signature 338 may be applied by hashing the signed minting request 336, encrypting the hash with a fifth private key, and attaching the encrypted hash to the signed minting request 336. The singly-director-signed minting request 344 may optionally be recorded in the distributed ledger 108. Optionally, a sixth signature 340 may be applied by hashing the payload (the singly-director-signed minting request 344), encrypting the hash with a sixth private key, and attaching the encrypted hash to the payload (the singly-director-signed minting request 344). The doubly-director-signed minting request 345 may optionally be recorded in the distributed ledger 108. In examples, the third-level signature(s) are added to the signed minting request 336, which is already on in the distributed ledger 108, by simply recording the third-level signature(s) on the distributed ledger 108 (instead of downloading the signed minting request 336 and re-recording it in the distributed ledger 108).

The fifth signature 338 and the optional sixth signature 340 are "third-level" signatures because they are applied at a director's office 120. The fifth private key and the optional sixth private key are "third-level" private keys because they belong to agent(s) of the director's office 120, e.g., director-level agents. The third-level private key(s) correspond to third-level public key(s) 348-3 in the distributed ledger 108.

In examples, the at least one third level signature are applied using a hardware authentication device (e.g., an HSM) communicatively coupled to the air-gapped computing device 116. Optionally, an HSM attestation token can be used to provide evidence that the private key (used to apply the at least one third-level signature) and/or the corresponding public key 348 being recorded in the distributed ledger 108 was generated (and is protected) by an HSM. The HSM attestation token can be recorded in the distributed ledger 108.

In some configurations, the air-gapped computing device 116 and/or the computing device 104-7 at the director's office 120 is required to verify the at least one first-level signature (using the first-level public key(s) 348-1) and/or the at least one first-level signature (using the second-level public key(s) 348-2) before the at least one third-level signature is applied.

Optionally, the group of agents of the currency management department 110 (authorized to apply the at least one second-level signature in step 408) can overlap (or is identical) with the group of agents of the director's office 120 (authorized to apply the at least one third-level signature in step 412). However, even in this type of configuration, a particular individual would never apply more than one signature at a particular level, e.g., if two second-level signatures are applied at the currency management department 110, it would require two different agents of the currency management department 110 even if one or both of those agents were also authorized to apply third-level signature(s) at the director's office 120.

The method 400A proceeds at optional step 414 where the at least one first-level signature, the at least one second-level signature, and the at least one third-level signature are verified are verified based on at least one first-level public key 348-1, at least one second-level public key 348-2, and at least one third-level public key 348-3, respectively. In other words, the smart contract 346 may attempt to verify each signature in the director-signed minting request (e.g., the singly-director-signed minting request 344 or doubly-director-signed minting request 345 (the "stock result")) using an active public key 348 stored in the distributed ledger 108 as of the time of the respective signature. The signatures may be verified in the same or reverse order they were applied in (or any other order). In examples, even though the signatures can be verified in any order, all first-level signatures must be applied before all second-level signatures and all second-level signatures must be applied before all third-level signatures.

In examples, optional step 414 includes verifying the at least one first-level signature (e.g., the first signature 332 and optional second signature 334) using the first-level public key(s) 348-1. Specifically, optional step 414 may include attempting to verify the first signature 332 against each of the first-level public key(s) 348-1 until one of the first-level public key(s) 348-1 successfully verifies the first signature or all the first-level public key(s) 348-1 have been tried. If all first-level public key(s) 348-1 have been tried and none verify the first signature 332, the smart contract request including the first signature is rejected without trying to verify the signature using the second-level public key(s) 348-2 or the third-level public key(s) 348-3. If present, optional step 414 may include attempting to verify the second signature 334 against each of the first-level public key(s) 348-1 until one of the first-level public key(s) 348-1 successfully verifies the second signature 334 or all the first-level public key(s) 348-1 have been tried. If all first-level public key(s) 348-1 have been tried and none verify the second signature 334, the smart contract request including the second signature 334 is rejected without trying to verify the signature using the second-level public key(s) 348-2 or the third-level public key(s) 348-3.

Optional step 414 includes a similar verification process for the at least one second-level signature (e.g., the third signature 333 and optional fourth signature 335) using the second-level public key(s) 348-2. Specifically, optional step 414 may include attempting to verify the third signature 333 against each of the second-level public key(s) 348-2 until one of the second-level public key(s) 348-2 successfully verifies the third signature 333 or all the second-level public key(s) 348-2 have been tried. If all second-level public key(s) 348-2 have been tried and none verify the third signature 333, the smart contract request including the third signature 333 is rejected without trying to verify the signature using the first-level public key(s) 348-1 or the third-level public key(s) 348-3. If present, optional step 414 may also include attempting to verify the fourth signature 335 against each of the second-level public key(s) 348-2 until one of the second-level public key(s) 348-2 successfully verifies the fourth signature 335 or all the second-level public key(s) 348-2 have been tried. If all second-level public key(s) 348-2 have been tried and none verify the fourth signature 335, the smart contract request including the fourth signature 335 is rejected without trying to verify the signature using the first-level public key(s) 348-1 or the third-level public key(s) 348-3.

Optional step 414 includes a similar verification process for the at least one at least one third-level signature (e.g., the fifth signature 338 and optional sixth signature 340) using the third-level public key(s) 348-3. Specifically, optional step 414 may include attempting to verify the fifth signature 338 against each of the third-level public key(s) 348-3 until one of the third-level public key(s) 348-3 successfully verifies the fifth signature 338 or all the third-level public key(s) 348-3 have been tried. If all third-level public key(s) 348-3 have been tried and none verify the fifth signature 338, the smart contract request including the fifth signature 338 is rejected without trying to verify the signature using the first-level public key(s) 348-1 or the second-level public key(s) 348-2. If present, optional step 414 may also include attempting to verify the sixth signature 340 against each of the third-level public key(s) 348-3 until one of the third-level public key(s) 348-3 successfully verifies the sixth signature 340 or all the third-level public key(s) 348-3 have been tried. If all third-level public key(s) 348-3 have been tried and none verify the sixth signature 340, the smart contract request including the sixth signature 340 is rejected without trying to verify the signature using the first-level public key(s) 348-1 or the second-level public key(s) 348-2.

In examples, the verifying in step optional step 414 may also include verifying that (1) the at least one first-level signature were all applied before all of the at least one second-level signature; and (2) the at least one second-level signature were all applied before all of the at least one third-level signature.

In examples where an HSM attestation token is recorded in the distributed ledger 108, third-level signature verification may optionally include verifying that the HSM attestation token (corresponding to the private key used for the signature) was generated (and is protected) by an HSM. In some configurations, this may include verifying the HSM token with the vendor of the HSM. For example, if a third-party auditor looked at the HSM attestation token on the distributed ledger 108, they would be able to verify that the associated private key was generated (and is protected) by an HSM with a certain defined level of security, e.g., without inspecting the HSM itself.

In examples, the director-signed minting request (e.g., the singly-director-signed minting request 344 or doubly-director-signed minting request 345) is passed to the smart contract 346 as a parameter in a smart contract request. In examples, the requesting computing device (e.g., a computing device 104-7 at the director's office 120) may subscribe to an event stream when it sends the smart contract request to the network node 102.

The method 400A proceeds at optional step 416 where digital currency is minted when (e.g., in response to) the at least one first-level signature, at least one second-level signature, and at least one third-level signature on the director-signed minting request (e.g., the singly-director-signed minting request 344 or doubly-director-signed minting request 345) are successfully verified. In examples, the minting includes new cryptographic tokens (each representing a unit of digital currency) being minted and sent to an address (on a distributed ledger 108) belonging to the currency management department 110 (e.g., a governor's currency control gateway wallet), after which the newly-minted tokens are optionally transferred to address(es) belonging to the requesting financial institution 112. Optionally, the first-level signature, at least one second-level signature, and at least one third-level signature on the director-signed minting request may be verified again before the newly-minted tokens are transferred from the governor's currency control gateway wallet to the address(es) belonging to the requesting financial institution 112.

The minting may also include initiating an event (on an event stream that a requesting computing device 104 is subscribed to) that indicates approval of the smart contract request (e.g., the minting has been performed). The requesting computing device 104 may listen for the event indicating approval of the smart contract request.

However, if the signatures are not successfully verified, the smart contract 346 may initiate an event (on an event stream that a requesting computing device 104 is subscribed to) that indicates rejection/failure of the smart contract request (e.g., the minting has not been performed). Any scenario, in which a public key is not present in the expected level of public keys 348 given the institution at which the signature was applied, wouldn't verify correctly. Specifically, if a public key corresponding to a private key used for a first signature 332 or a second signature 334 is not found in the first-level public key(s) 348-1, the signatures will not all verify successfully and minting will not be performed. Similarly, if a public key corresponding to a private key used for a third signature 333 or a fourth signature 335 is not found in the second-level public key(s) 348-2, the signatures will not all verify successfully and minting will not be performed. Similarly, if a public key corresponding to a private key used for a fifth signature 338 or a sixth signature 340 is not found in the third-level public key(s) 348-3, the signatures will not all verify successfully and minting will not be performed.

Figure 4B:
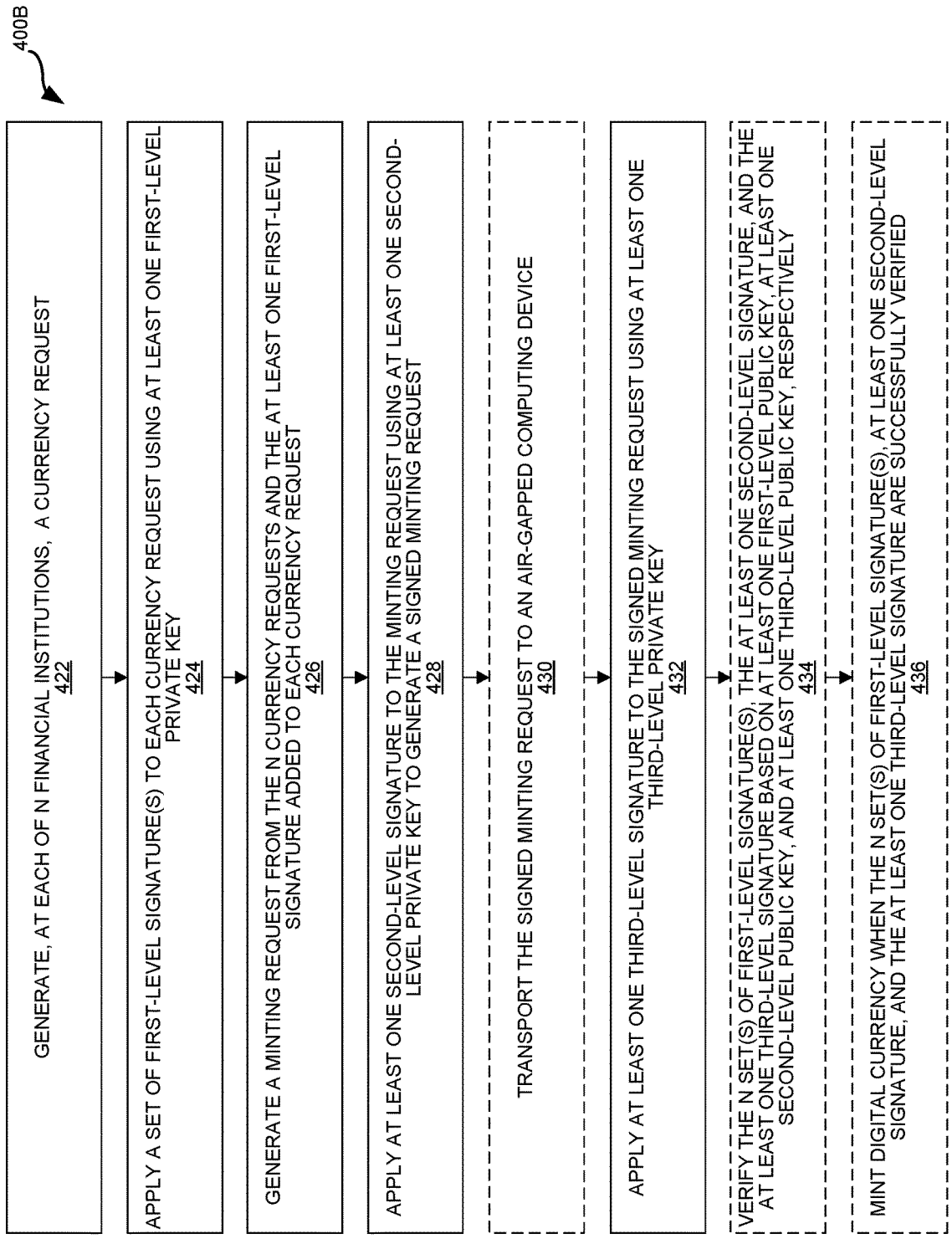
FIG. 4B is a flow diagram illustrating another exemplary method for generating a minting request.

FIG. 4B is a flow diagram illustrating another exemplary method 400B for generating a minting request 336. The method 400B may be performed in a system 100 with: (1) N financial institution(s) 112, each using at least one computing device 104 to sign transactions for a distributed ledger 108; (2) a currency management department 110 that uses at least one computing device 104 to sign transactions for a distributed ledger 108; (3) at least one director's office 120, each with at least one computing device and an optional air-gapped computing device 116 communicatively coupled to an HSM for signing transactions for a distributed ledger 108; and (4) a peer-to-peer network 114 of network nodes 102, each storing a copy of the distributed ledger 108. Any of the data (or a hash of the data) at each stage of the method 400B (e.g., following generation and/or signing of the data) may optionally be recorded in the distributed ledger 108 where it's always visible in the transaction history.

The method 400B begins at step 422 where a computing device 104, at each of N financial institutions 112, generates a currency request 330. In examples, N is greater than or equal to one. In examples, each currency request 330 can include an amount of currency requested, a time stamp the currency request was generated, and/or an ID of the requesting financial institution 112. The currency requests 330 may optionally be recorded in the distributed ledger 108.

The method 400B proceeds at step 424 where a set of first-level signature(s) is applied to each currency request 330 using at least one first-level private key, e.g., at the respective financial institution 112. Each set of first-level signatures includes at least one first-level signature. In examples, a first signature 332 may be applied to a first currency request 330 by hashing the first currency request 330, encrypting the hash with a first private key, and attaching the encrypted hash to the Nth currency request 330. Optionally, a second signature 334 may be applied to the resulting singly-signed currency request 352 by hashing the payload (the first currency request 330-1 and its first signature 332), encrypting the hash with a second private key, and attaching the encrypted hash to the payload (the first currency request 330-1 and its first signature 332).

A similar process may be performed for each of the N currency requests 330. For example, a third signature 333 may be applied to an Nth currency request 330 by hashing the Nth currency request 330-N, encrypting the hash with a first private key, and attaching the encrypted hash to the Nth currency request 330-N. Optionally, a fourth signature 335 may be applied to the resulting singly-signed currency request 352 by hashing the payload (the Nth currency request 330-N and the third signature 333), encrypting the hash with a second private key, and attaching the encrypted hash to the payload (the Nth currency request 330-N and the third signature 333).

The singly-signed currency requests 352 and/or doubly-signed currency requests 354 may optionally be recorded in the distributed ledger 108. The first signature 332, optional second signature 334, third signature 333, and optional fourth signature 335 are "first-level" signatures because they are applied at the financial institutions 112. The first private key, the optional second private key, third private key, and optional fourth private key are "first-level" private keys because they belong to agents of the financial institutions 112. The first-level private keys correspond to first-level public key(s) 348-1 in the distributed ledger 108.

The method 400B proceeds at step 426 where a minting request 336 is generated from the N currency requests 330 and the at least one first-level signature added to each currency request 330. In other words, the minting request may be generated from N singly-signed currency requests 352 and/or doubly-signed currency request 354. In examples, the minting request 336 is formatted into a JavaScript Object Notation (JSON) representation (or other formatting protocol, such as XML). In examples, step 426 can be performed at a currency management department 110. Alternatively, the currency requests 330 can be formatted into a different format (e.g., JSON, XML, etc.) by the financial institution(s) 112 before being packaged into a minting request 336.

In examples, the minting request 336 may include any of the following fields: (1) the total amount of digital currency (e.g., DXCD) to mint; (2) time stamp (e.g., based on an HLF time or other single source of truth/master clock); (3) an approver ID (e.g., which can be traced to a username); and/or (4) an expiration time (or Time To Live (TTL)) after which the minting request 336 expires. In examples, the time stamp is based on the time kept by the network nodes 102, e.g., a clock on a computing device 104 (at the currency management department 110) that is synchronized to a master clock kept by the network nodes 102. In examples, the network nodes 102 may use a clock synchronization protocol to ensure that their clocks are within a small error of an atomic clock.

The method 400B proceeds at step 428 where at least one second-level signature is applied to the minting request 336 using at least one second-level private key (e.g., at the currency management department 110) to generate a signed minting request. In examples, a fifth signature 338 may be applied to the minting request 336 by hashing the minting request 336, encrypting the hash with a fifth private key, and attaching the encrypted hash to the minting request 336. The singly-signed minting request 358 may optionally be recorded in the distributed ledger 108. Optionally, a sixth signature 340 may be applied to the singly-signed minting request 358 by hashing the payload (the minting request 336 and the fifth signature 338), encrypting the hash with a sixth private key, and attaching the encrypted hash to the payload (the minting request 336 and the fifth signature 338). The doubly-signed minting request 360 may optionally be recorded in the distributed ledger 108.

The fifth signature 338 and the optional sixth signature 340 are "second-level" signatures because they are applied at the currency management department 110. The fifth private key and the optional sixth private key are "second-level" private keys because they belong to agents of the currency management department 110. The second-level private key(s) correspond to second-level public key(s) 348-2 in the distributed ledger 108.

In some configurations, a computing device 104-7 at the currency management department 110 is required to verify the at least one first-level signature (using the first-level public key(s) 348-1) on each currency request 330 before the at least one second-level signature is applied.

The method 400B proceeds at optional step 430 where the signed minting request 336 (e.g., the singly-signed minting request 358 or doubly-signed minting request 360) is transported to an air-gapped computing device 116, e.g., at a director's office 120. This may include using a networked computing device 104-7 to store the signed minting request 336 on removable storage (e.g., a USB drive), then inserting the removable storage into the air-gapped computing device 116. Alternatively, if an air-gapped computing device 116 is not used, optional step 430 is skipped and the method proceeds from step 428 to step 422.

The method 400B proceeds at step 432 where at least one third-level signature is applied to the signed minting request 336 (e.g., the singly-signed minting request 358 or doubly-signed minting request 360) using at least one third-level private key. In examples, the at least one signature is applied at the air-gapped computing device 116 or other computing device 104-7 at a director's office 120. In examples, a seventh signature 342 may be applied by hashing the signed minting request 336, encrypting the hash with a seventh private key, and attaching the encrypted hash to the signed minting request 336. The singly-director-signed minting request 344 may optionally be recorded in the distributed ledger 108. Optionally, an eighth signature 343 may be applied by hashing the payload (the singly-director-signed minting request 344), encrypting the hash with an eighth private key, and attaching the encrypted hash to the payload (the singly-director-signed minting request 344). The doubly-director-signed minting request 345 may optionally be recorded in the distributed ledger 108.

The seventh signature 342 and the optional eighth signature 343 are "third-level" signatures because they are applied at a director's office 120. The seventh private key and the optional eighth private key are "third-level" private keys because they belong to agent(s) of the director's office 120. The third-level private key(s) correspond to third-level public key(s) 348-3 in the distributed ledger 108.

In some configurations, the air-gapped computing device 116 and/or the computing device 104-7 at the director's office 120 is required to verify the at least one first-level signature (using the first-level public key(s) 348-1) and/or the at least one first-level signature (using the second-level public key(s) 348-2) before the at least one third-level signature is applied.

The method 400B proceeds at optional step 434 where the N set(s) of first-level signature(s), the at least one second-level signature, and the at least one third-level signature are verified based on at least one first-level public key 348-1, at least one second-level public key 348-2, and at least one third-level public key 348-3, respectively. In other words, the smart contract 346 may attempt to verify each signature in the director-signed minting request (e.g., the singly-director-signed minting request 344 or doubly-director-signed minting request 345) using an active public key 348 stored in the distributed ledger 108 as of the time of the respective signature. In examples, optional step 434 includes verifying the at least one first-level signature (e.g., the first signature 332, optional second signature 334, the third signature 333, and optional fourth signature 335) using the first-level public key(s) 348-1; verifying the at least one second-level signature (e.g., the fifth signature 338 and optional sixth signature 340) using the second-level public key(s) 348-2; and verifying the at least one third-level signature (e.g., the seventh signature 342 and the eighth signature 343) using the third-level public key(s) 348-3. The signatures may be verified in the same or reverse order they were applied in (or any other order). In examples, even though the signatures can be verified in any order, all first-level signatures must be applied before all second-level signatures and all second-level signatures must be applied before all third-level signatures.

In examples, the verifying in step optional step 434 may also include verifying that (1) the N sets of first-level signatures were all applied before all of the at least one second-level signature; and (2) the at least one second-level signature were all applied before all of the at least one third-level signature.

In examples, the director-signed minting request (e.g., the singly-director-signed minting request 344 or doubly-director-signed minting request 345) is passed to the smart contract 346 as a parameter in a smart contract request. In examples, the requesting computing device (e.g., a computing device 104-7 at the director's office 120) may subscribe to an event stream when it sends the smart contract request to the network node 102.

The method 400B proceeds at optional step 436 where digital currency is minted when (e.g., in response to) the N set(s) of first-level signature(s), at least one second-level signature, and at least one third-level signature on the director-signed minting request (e.g., the singly-director-signed minting request 344 or doubly-director-signed minting request 345) are successfully verified. In examples, the minting includes new tokens being minted sent to an address belonging to the currency management department 110 (e.g., a governor's currency control gateway wallet), after which the newly-minted tokens are optionally transferred to address(es) belonging to the N requesting financial institution(s) 112. The minting may also include initiating an event (on an event stream that a requesting computing device 104 is subscribed to) that indicates approval of the smart contract request (e.g., the minting has been performed). The requesting computing device 104 may listen for the event indicating approval of the smart contract request.

However, if the signatures are not successfully verified, the smart contract 346 may initiate an event (on an event stream that a requesting computing device 104 is subscribed to) that indicates rejection/failure of the smart contract request (e.g., the minting has not been performed). Any scenario, in which a public key is not present in the expected level of public keys 348 given the institution at which the signature was applied, wouldn't verify correctly. Specifically, if a public key corresponding to a private key used for a first signature 332, a second signature 334, a third signature 333, or a fourth signature 335 is not found in the first-level public key(s) 348-1, the signatures will not all verify successfully and minting will not be performed. Similarly, if a public key corresponding to a private key used for a fifth signature 338 or a sixth signature 340 is not found in the second-level public key(s) 348-2, the signatures will not all verify successfully, and minting will not be performed. Similarly, if a public key corresponding to a private key used for a seventh signature 342 and an eighth signature 343 is not found in the third-level public key(s) 348-3, the signatures will not all verify successfully, and minting will not be performed.

FIG. 5 is a block diagram illustrating a system 500 for key rotation that may be used with the present disclosure. In examples, any of (or a combination of) the public keys 348, 350 stored on the distributed ledger 108 may be rotated periodically or on demand. In examples, the public key 562-1 in FIG. 5 is a third-level public key 348-3 (generated with a corresponding third-level private key at an air-gapped computing device 116) that is being rotated, however, the key rotation techniques described herein could be applied to the any keys that are rotated inside or outside of digital minting system 100.

FIG. 5 illustrates two HSM clients 566A-B, the second of which may be located in a hardware security module (HSM)

511. In some configurations, the first HSM client 566A is located in a first computing device 516 (e.g., an air-gapped computing device 116 in a director's office 120) and the HSM 511 is a stand-alone physical device that generates and stores key(s) (and may be the only entity that ever stores a copy of the private key(s) it generates). Alternatively, the HSM 511 (and therefore second HSM client 566B) may be located in the same physical device as the first HSM client 566A (the first computing device 516). Furthermore, unless otherwise noted, the HSM 511 in FIG. 5 may operate similarly to the HSM 211 previously described.

Key rotation can be used to increase the difficulty for an attacker to gain access to a system because the attacker would first have to identify which version of a key is currently active. One challenge associated with key rotation is how to ensure that a new key is received from a trusted source. Conventionally, each new received key would have to be trusted independent of whether the old key was trusted. This may include offline techniques of transporting keys, having witnesses to the transfer of keys, etc.

In contrast, in the present systems and methods, an old private key 561-2 can be used to sign the new public key 562-1 before the new public key 562-1 is sent to the distributed ledger 108 and set to "active". This is made possible because a new public key 562-1 may be generated at the same time as a corresponding new private key 561-1 (and both the new public key 562-1 and corresponding new private key 561-1 are rotated at the same time). In examples, the distributed ledger 108 may record which private key 561 was used to sign that transaction as well as the signature itself. This signature inherently verifies that the new public key 562-1 came from the same trusted source/keyholder as the old public key 562-2 (because the trusted source had to have access to the old private key 561-2 to sign the new public key 562-1). This process can be repeated every time the public/private keypair is rotated, which creates a cryptographically verifiable chain of trust from the current public/private keypair to the original public/private keypair.

The benefit of rotating keys this way is that as long as that first public key 562 recorded on the distributed ledger 108 is clean (came from a trusted source, such as a financial institution 112, a currency management department 110, or a director's office 120), then an auditor can verify whether every subsequent public key 562 also came from the same trusted source. In other words, as long as that first public key 562 is trusted, then every subsequent public key 562 after will also be trusted. Since all of these public keys 562 and the signatures sent with them (when they are transmitted to the distributed ledger 108) will be stored on the distributed ledger 108, an auditor could cryptographically prove that each public key 562 introduced into the system originated from that same source (e.g., HSM device) that is controlled by the trusted entity (e.g., a financial institution 112, a currency management department 110, a director's office 120, etc.).

Furthermore, using a verifiable chain of trust (created by storing on the distributed ledger 108 each new public key and the respective signature attached to it) enables cryptographic proof that the source (e.g., device or person) of the new public key 562-1 is the same source that sent the old public key 562-2 even though the two public keys 562 are mathematically independent of each other.

It is understood that the label "new," when used to refer to a key, may be transitory, e.g., a new key may become an old key when it becomes inactive and another "new" key takes its place as the active key. Furthermore, there may be multiple generations of "old" keys since each new key becomes an old key as it is rotated from being an active key to an inactive key.

The HSM 511 may implement a library of functions (e.g., an application programming interface (API)) that outside devices can use to interact with it. The library of functions may be a set of instructions that is executable by at least one processor to perform various functionality relating to the HSM 511, e.g., to create user accounts (with associated credentials) on the HSM 511, to pass user credentials to the HSM 511 during authentication, to request that the HSM 511 generate or delete a user's private key, to send the HSM 511 data (such as a public key) to sign with a private key, to associate a private key with a particular user, etc.

In examples, the first HSM client 566A may send credentials to the second HSM client 566B (on the HSM 511) requesting a user be authenticated; the second HSM client 566B may reply with an indication of successful authentication; the first HSM client 566A may then send a request for the second HSM client 566B to generate a new public key 562-1 and a corresponding new private key 561-1 and to add a signature 572 to the new public key 562-1 with an old private key 561-2; and the second HSM client 566B may send the signed new public key 567 to the first HSM client 566A. In examples, the HSM 511 generates the new public key 562-1, sends it to the first computing device (via the HSM clients 566A-B), then the first computing device 516 sends the new public key 562-1 back to the HSM 511 with a request that it sign the new public key 562-1 with the old private key 561-2 and return the signed public key 567. In examples, the first computing device 516 is an air-gapped computing device 116 and the signed new public key 567 is transferred from the first computing device 516 to a second computing device 504 (e.g., a computing device 104-7 in a director's office 120) that sends it to a network node 102 implementing the distributed ledger 108. In examples, the signed new public key 567 is in a special file (with the new public key 562-1 and the signature of the new public key 572) that is transferred from the first computing device 516 to a second computing device 504 via removable storage media (e.g., a portable USB drive), then uploaded to the distributed ledger 108 by the second computing device 504 (e.g., via a distributed ledger 108 transaction that is separate from any other distributed ledger 108 transactions).

In examples, the new public key 562-1 corresponds to and is derived from the new private key 561-1. In examples, the new private key 561-1 and new public key 562-1 (and optionally a corresponding address) are generated using a single function. The new private key 561-1, however, would generally not be derivable from the new public key 562-1. In examples, the old private key 561-2 may be used to sign payloads (such as the new public key 562-1), while only the old public key 562-2 can be used to validate those signatures (e.g., at the distributed ledger 108 that receives signed new public key 567).

In examples, the new private key 561-1 is mathematically independent from the old private key 561-2. Thus, one cannot be derived from the other if the new private key 561-1 or the old private key 561-2 is compromised. Specifically, the new private key 561-1 is not a child key derived from the old private key 561-2, e.g., the new private key 561-1 is not determined using hierarchical deterministic (HD) key derivation. Similarly, the new public key 562-1 may be mathematically independent from the old public key 562-2.

It should be noted that any of the old private key 561-2, old public key 562-2, new private key 561-1, and/or new public key 562-1 may also be backed up outside of the HSM 511. In examples, the new private key 561-1 is backed up in any suitable way because if it were to be permanently lost or compromised, it would make key rotation (as described herein) impossible (since the new private key 561-1 could not sign an additional public key (not shown) to replace the new public key 562-1).

The HSM 511 may implement objects (persistently-stored and self-contained pieces of information). In examples, the new public key 562-1 (and optionally old public key(s) 562-2) can be stored as an object in a key database 568-1 on the HSM 511 and identified with a specific object ID, e.g., object IDs may have values in the range of [0-65535] or [0x0000-0xffff] in hexadecimal. In some configurations, the HSM 511 may be limited in the number of objects it can store, e.g., 256, 512, 1024, etc.

It should be noted that objects may not be limited to storing public keys but could additionally or alternatively be used to store private keys 561 or other types of data. Given that the number of objects stored on the HSM 511 may be limited, objects representing old public keys 562-2 or old private keys 561-2 can be deleted from the HSM 511 in some configurations. Optionally, the key database 568-1 may also store configuration information indicating authorized users of the HSM 511, their credentials for authentication, and/or their permissions (e.g., signing, generating new keys, deleting old keys, etc.).

A key database 568-2 can optionally be stored on the first computing device 516 and/or the second computing device 504, which also stores the objects representing at least some of the public keys 562 generated by the HSM 511. In some configurations, each public key object in the key databases 568 may have: the public key 562 itself; an expiry indication that indicates the date and/or time at which the public key 562 expires; an object ID; a state (indicating whether the public key 562 is ACTIVE or INACTIVE); and/or a signature 572 of the public key 562, e.g., signed by the private key 561 that was in use immediately before the respective public key 562. In examples, a private key 561 is generated at the same time as a corresponding public key 562 and both keys will have the same time of expiration, meaning that both keys will need to be rotated at the same time (though only the public key 562 is stored on the distributed ledger 108). Furthermore, the different key databases 568 on different devices may store the same or different data.

Since it includes each public key 562 and a signature of each public key 562-2, the key database 568-2 (and/or key databases 568-1, 568-3) can keep track of the chain of trust over time because the signatures are all available for validation. In examples, an auditor could use take a new public key 562-1 and the signature of the new public key 562-1 in the key database 568-2 and validate the signature to cryptographically prove that it was made using an old private key 561-2 that corresponds with an old public key 562-2 used to verify. This process could be repeated for each public key 562 in the key database 568-2 using the immediately prior private key 561 and public key 562.

In examples, key rotation can be automated, e.g., where it is triggered periodically. In examples, the HSM 511 may generate the new public key 562-1 and new private key 561-1 at periodic intervals and/or based on the expiry for the old public key 562-2 having passed. Alternatively, the HSM 511 may generate the new public key 562-1 and new private key 561-1 in response to a request, e.g., sent from the first HSM client 566A. Once the new public key 562-1 and new private key 561-1 are generated, the HSM 511 may apply a signature 572 to the new public key 562-1 using the old private key 561-2, which can only be validated using the old public key 562-2. The new public key 562-1 and the signature of the new public key 572 may be transmitted to the first computing device 516 then optionally transferred to the second computing device 504 (e.g., via removable media when the first computing device 516 is air-gapped). The new public key 562-1 and the signature of the new public key 572 may then be transmitted to the distributed ledger 108 (e.g., via a special file separate from any minting requests 336) for storage. In examples, a smart contract on the distributed ledger 108 may implement instructions executable to validate the signature 572 using the old public key 562-2 (on the distributed ledger 108) before storing the new public key 562-1 on the distributed ledger 108 and optionally using it to validate signatures on future minting requests 336. Optionally, the second computing device 504 may also validate the signature 572 using the old public key 562-2 (e.g., in the key database 568-3) before uploading the new public key 562-1 and signature 572 to the distributed ledger 108. In examples, the state of the old public key 562-2 may be changed from ACTIVE to INACTIVE in any applicable key databases 568 once the new public key 562-1 is stored on the distributed ledger 108 following validation of the signature 572.

In an example where the public keys 562 are used in the digital minting process, as described herein, a record may be stored (e.g., on the distributed ledger 108) every time new digital currency is minted. This record may indicate, for each minting, any of the following: the minting request 336; any or all of the signatures of the minting request 336; the public key(s) 562 used to validate the signatures of the minting request 336; and/or the signature(s) of the public key(s) 562 used to validate the signatures of the minting request 336.

As noted above, however, the key rotation described herein is not limited to the digital minting process. The key rotation described herein may be particularly beneficial for scenarios where mathematically independent keys (e.g., public keys 562) are rotated and stored on a distributed ledger 108. In these scenarios, the key rotation described herein provides a chain of trust between the different generations of keys due to the fact that the lineage of keys can be audited/traced back from the most recent key to the original genesis key.

In one example, a database or table, meant to store keys using an appropriate data type, may be stored on a distributed ledger 108. Where each entry (key) into the database or table must be signed (and signature validated), the signature of any new entry (key) could be validated with the previous entry (key) to ensure the new entry (key) came from an authorized user.

In another example, the key rotation could be during encrypted electronic communication, e.g., Hypertext Transfer Protocol Secure (HTTPS). In encrypted communication, the transmitted data is encrypted (e.g., using Transport Layer Security (TLS) or Secure Sockets Layer (SSL)) and each device sends the other a public key 562 (corresponding to their respective private key 561) to use when decrypting communications from them. In this example, one or both devices could rotate/update their old public key 562-2 in the middle of an encrypted session by generating a new public key 562-1 (and corresponding new private key 561-1), signing it with their old private key 561-2, and sending to their counterparty device. The counterparty device could validate the signature of the new public key 562-1 using the old public key 562-2 and, if the signature validates, begin using the new public key 562-1 because it came from a trusted source.

Figure 6:
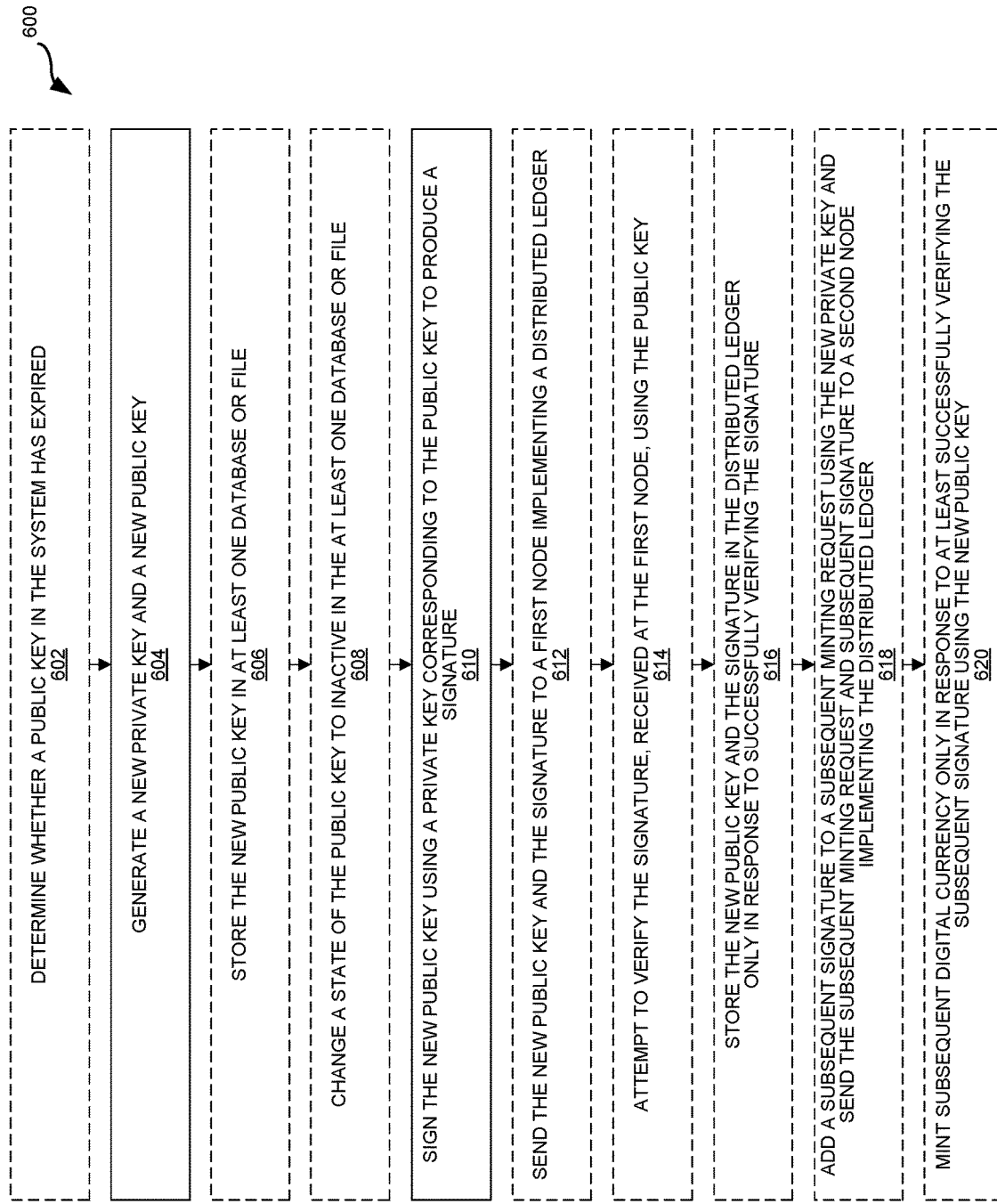
FIG. 6 is a flow diagram illustrating a method for rotating keys.

FIG. 6 is a flow diagram illustrating a method 600 for rotating keys. The method 600 may be performed by at least some of the devices in the system 500 of FIG. 5, e.g., at least the first computing device 516 and an HSM 511. In examples, the method 600 is performed by at least one processor (in at least one device in the system 500 of FIG. 5) executing instructions stored in at least one memory.

The method 600 begins at optional step 602 where the at least one processor determine whether a public key 562 in the system 500 has expired. In examples, the public key 562 corresponds to a private key 561 where only the public key 562 can validate digital signatures generated using the corresponding private key 561. In examples, the public key 562 may be identified as the public key 562 most recently stored in a key database 568. Optionally, the private key 561 (corresponding to the public key 562) may also be stored in the key database 568. In examples, the first computing device 516 may perform step 602 when a minting request 336 needs to be signed or when the public key 562 is otherwise needed to perform some action, e.g., encrypting data or validating a signature.

In examples, optional step 602 is performed when a computing device 104-7 at a director's office 120 receives a minting request 336 (e.g., a singly-signed minting request 358 or a doubly-signed minting request 360) from a currency management department 110 and before adding any additional signatures to the minting request 336 at the director's office 120. In these examples, the method 600 may ensure that any private keys 561 that will be used to add additional signatures to the minting request 336 are not expired.

In response to determining that the public key 562 is not expired, the at least one processor may proceed to use the public key 562 as intended. In examples, this includes adding at least one additional signature to the minting request 336 (using a private key 561 corresponding to the public key 562), which can only be validated using the public key 562. In this scenario the public key 562 is still active and can be considered a new public key 562-1.

The method 600 proceeds at step 604 where the at least one processor (e.g., in response to determining that the public key 562 has expired) generates a new private key 561-1 and a new public key 562-1. In examples, the first computing device 116 may send a request to a hardware security module (HSM) 511 to generate the new private key 561-1 and new public key 562-1 and receive the new public key 562-1 from the first computing device 116. In this scenario the original public key 562 (that is expired) should no longer be used and can be considered an old public key 562-2, assuming the new public key 562-1 is stored on the distributed ledger 108 as an active key. In examples, the HSM 511 is communicatively coupled to the first computing device 516 via a wired connection, e.g., USB, etc. Alternatively, the new keys could be generated and stored in a secure enclave on the first computing device 516 (e.g., using iOS® KEYCHAIN® or ANDROID® Keystore) where the new private key 561-1 never leaves the secure enclave on the first computing device 516.

The method 600 proceeds at optional step 606 where the at least one processor, in response to determining that the public key 562 has expired, stores the new public key 562-1 in at least one database or file, e.g., in a key database 568 on the first computing device 516, the HSM 511, and/or a second computing device 504. Optionally, a corresponding state for the new public key 562-1 in the at least one database or file is set to active. Optionally, an object ID may also be stored in the at least one database or file. Optionally, an explicit expiration date and/or time may also be indicated in the at least one database or file.

The method 600 proceeds at optional step 608 where the at least one processor, in response to determining that the public key 562 has expired, changes a state of the public key 562 to inactive in the at least one database or file. Additionally or alternatively, the at least one processor may delete the public key 562 from the at least one database or file in response to determining that the public key 562 has expired.

The method 600 proceeds at step 610 where the at least one processor, in response to determining that the public key 562 has expired, signs the new public key 562-1 using the private key 561 corresponding to the public key 562 to produce a signature 572. In other words, the new public key 562-1 is signed using the old private key 561-2 to produce a signature 572. Optionally, the at least one processor also stores the signature of the new public key 572 in the at least one database or file.

In examples, the signature can be generated in step 610 by: (1) using a cryptographic hashing function on the new public key 562-1 to produce a hash (also called a "digest") of the new public key 562-1; (2) encrypting the hash/digest with the old private key 561-2. The encrypted hash/digest may then be appended or otherwise attached to the new public key 562-1.

The method 600 proceeds at optional step 612 where the at least one processor, in response to determining that the public key 562 has expired, sends the new public key 562-1 and the signature of the new public key 572 to a first node 102 implementing the distributed ledger 108.

The method 600 proceeds at optional step 614 where the at least one processor attempts to verify the signature 572, received at the first node 102, using the public key 562. In order to verify the signature 572, a smart contract may: (1) decrypt the signature 572 using the old public key 562-2 corresponding to the old private key 561-2 used for signing; (2) determine a hash of the original new public key 562-1; and (3) compare the decrypted hash from (1) with the hash (from (2)) to determine if both are the same. The signature is verified only if the decrypted hash from (1) is the same as the hash (from (2)).

The method 600 proceeds at optional step 616 where the at least one processor (e.g., at the first node 102 implementing the distributed ledger 108) stores the new public key 562-1 and optionally the signature 572 in the distributed ledger 108 only in response to successfully verifying the signature 572.

The method 600 proceeds at optional step 618 where the at least one processor (e.g., in the first computing device 516) adds a subsequent signature to a subsequent minting request 336 using the new private key 561-1 and sends (e.g., via the second computing device 104) the subsequent signature to a subsequent minting request 336 to a second node 102 implementing the distributed ledger 108 (where the second node 102 is the same or different than the first node 102).

The method 600 proceeds at optional step 620 where the at least one processor (e.g., in the second node 102 implementing the distributed ledger 108) mints subsequent digital currency only in response to at least successfully verifying the subsequent signature using the new public key 562-1 (and optionally verifying any other signatures sent in or with the subsequent minting request 336).

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Figure 7:
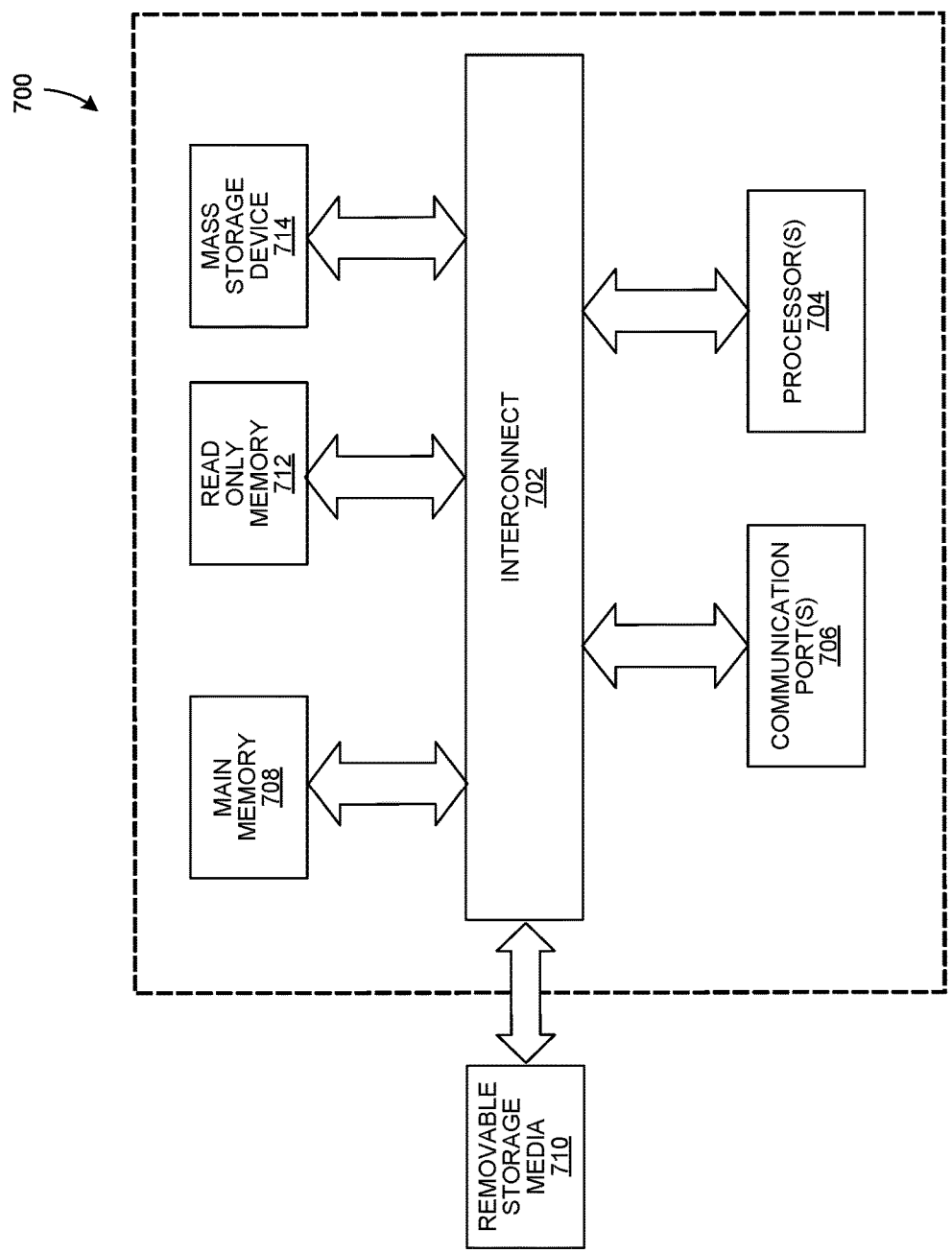
FIG. 7 is a block diagram illustrating an exemplary computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present disclosure may be utilized. For example, the computer system 700 may implement a computing device 102 and/or computing device 104 described above. According to the present example, the computer system 700 includes an interconnect 702, at least one processor 704, at least one communication port 706, at least one main memory 708, at least one removable storage media 710, at least one read only memory 712, and at least one mass storage device 714.

The at least one processor 704 can be any known processor. The at least one communication port 706 can be or include, for example, any of an RS-232 port for use with a modem-based dialup connection, a 10/100 Ethernet port, or a Gigabit port using copper or fiber. The nature of the at least one communication port 706 may be chosen depending on a network such a Local Area Network (LAN), Wide Area Network (WAN), or any network to which the computer system 700 connects. The at least one main memory 708 can be Random Access Memory (RAM), or any other dynamic storage device(s) commonly known in the art. The at least one read only memory 712 can be any static storage device(s) such as Programmable Read Only Memory (PROM) chips for storing static information such as instructions for the at least one processor 704.

The at least one mass storage device 714 can be used to store information and instructions. For example, hard disks (such as magnetic disk drives or solid state drive using serial/parallel ATA or SCSI interfaces), an optical disc, an array of disks such as a Redundant Array of Independent Disks (RAID), or any other mass storage devices may be used. Interconnect 702 can be or include one or more buses, bridges, controllers, adapters, and/or point-to-point connections. Interconnect 702 communicatively couples the at least one processor 704 with the other memory, storage, and communication blocks. Interconnect 702 can be a PCI/PCI-X or SCSI based system bus depending on the storage devices used. The at least one removable storage media 710 can be any kind of external hard-drives, floppy drives, Compact Disc-Read Only Memory (CD-ROM), Compact Disc-Re-Writable (CD-RW), Digital Video Disc-Read Only Memory (DVD-ROM), Blu-Ray Disc Read Only Memory (BD-ROM), Blu-Ray Disc Recordable (BD-R), Blu-Ray Disc Recordable Erasable (BD-RE).

The components described above are meant to exemplify some types of possibilities. In no way should the aforementioned examples limit the disclosure, as they are only exemplary embodiments. The embodiments, structure, and methods described herein, including those below and above, can be combined together in various ways.

Terminology

Brief definitions of terms, abbreviations, and phrases used throughout this application are given below.

The phrase "based on" does not mean "based only on," unless expressly specified otherwise. in other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure and may be included in more than one embodiment of the present disclosure. in addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for securely splitting, distributing, and/or reconstructing keys. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a system comprising: at least a first computing device at a financial institution, the first computing device configured to: generate a currency request indicating a request for more digital currency to be minted; and apply at least one first-level signature to the currency request using at least one first-level private key, wherein a minting request is generated from the currency request and the at least one first-level signature; at least a second computing device at a currency management department, the second computing device configured to apply at least one second-level signature to the minting request using at least one second-level private key to generate a signed minting request; at least a third computing device at a director's office, the third computing device configured to apply at least one third-level signature to the signed minting request using at least one third-level private key; and a plurality of network nodes communicatively coupled in a peer-to-peer network of network nodes implementing a distributed ledger, at least one of the network nodes configured to: verify the at least one first-level signature, the at least one second-level signature, and the at least one third-level signature using at least one first-level public key, at least one second-level public key, and at least one third-level public key, respectively; and mint the digital currency when the at least one first-level signature, the at least one second-level signature, and the at least one third-level signature are successfully verified.

Example 2 includes the system of Example 1, wherein verifying the at least one first-level signature, the at least one second-level signature, and the at least one third-level signature comprises: verifying that all of the at least one first-level signature were applied before all of the at least one second-level signature; and verifying that all the at least one second-level signature were applied before all of the at least one third-level signature.

Example 3 includes the system of any of Examples 1-2, wherein the distributed ledger is a blockchain using a private, permissioned blockchain platform.

Example 4 includes the system of any of Examples 1-3, wherein verifying the at least one first-level signature, the at least one second-level signature, and the at least one third-level signature comprises: verifying the at least one first-level signature using at least one first-level public key, in the distributed ledger, corresponding to the at least one first-level private key; verifying the at least one second-level signature using at least one second-level public key, in the distributed ledger, corresponding to the at least one second-level private key; and verifying the at least one third-level signature using at least one third-level public key, in the distributed ledger, corresponding to the at least one third-level private key.

Example 5 includes the system of any of Examples 1-4, wherein the third computing device is an air-gapped computing device that does not have any wireless radios or other network access.

Example 6 includes the system of any of Examples 1-5, wherein each of the at least one first-level private key is controlled by a different agent of the financial institution; wherein each of the at least one second-level private key is controlled by a different agent of the currency management department; and wherein each of the at least one third-level private key is controlled by a different agent of the director's office.

Example 7 includes the system of any of Examples 1-6, wherein a single one of the at least one first-level private key is shared by multiple agents of the financial institution, wherein each of the multiple agents accesses the first-level private key with a respective user account that implements an authentication process before access is given to the first-level private key.

Example 8 includes the system of any of Examples 1-7, wherein when each first-level private key is generated, a corresponding first-level public key is generated and stored in the distributed ledger; wherein when each second-level private key is generated, a corresponding second-level public key is generated and stored in the distributed ledger; and wherein when each third-level private key is generated, a corresponding third-level public key is generated and stored in the distributed ledger.

Example 9 includes the system of Example 8, wherein each first-level public key, second-level public key, and third-level public key is stored in the distributed ledger with any of the following: a time-to-live (TTL) after which the respective public key is no longer an active key; an indication that the respective public key is an active key; and an indication that the respective public key is a first-level public key, a second-level public key, or a third-level public key.

Example 10 includes the system of any of Examples 8-9, wherein the third computing device at a director's office is configured to rotate one of the third-level public keys by: determining whether the third-level public key is expired; in response to determining that third-level public key is expired, generating a new third-level public key and a new third-level private key at an air-gapped computing device; signing the new third-level public key using one of the at least one third-level private key to produce a signature; sending the new third-level public key and the signature to a first node implementing the distributed ledger; and adding a subsequent signature to a subsequent minting request using the new third-level private key.

Example 11 includes the system of Example 10, wherein each of the at least one of the network nodes is configured to: attempt to verify the signature, received at the respective network node, using the third-level public key in the distributed ledger; store the new third-level public key and the signature in the distributed ledger only in response to successfully verifying the signature; and mint subsequent digital currency only in response to at least successfully verifying the subsequent signature using the new third-level public key.

Example 12 includes the system of any of Examples 1-11, wherein applying a signature to a payload of data using a private key comprises using Pretty Good Privacy (PGP) protocol by: generating a hash of the payload; encrypting the hash with the private key; and attaching the encrypted hash to the payload.

Example 13 includes the system of any of Examples 1-12, wherein verifying a signature attached to a payload of data, using a public key corresponding to a private key used to apply the signature, comprises using Pretty Good Privacy (PGP) protocol by: decrypting the signature with the public key; generating a hash of the payload; and comparing the decrypted signature with the hash to determine if they are the same, wherein the signature is successfully verified only if the decrypted signature and the hash are the same.

Example 14 includes the system of any of Examples 1-13, wherein, following minting, the digital currency is transferred to at least one address belonging to the currency management department, after which the digital currency is transferred to at least one address belonging to the financial institution.

Example 15 includes the system of any of Examples 1-14, wherein the third computing device uses a hardware security module (HSM) to apply the at least one third-level signature.

Example 16 includes the system of Example 15, wherein for each third-level signature applied by the HSM with a third-level private key, an HSM attestation token is associated with a corresponding third-level public key stored on the distributed ledger; and wherein each HSM attestation token indicates that the third-level private key, corresponding to the third-level public key, was generated and is protected by the HSM.

Example 17 includes the system of any of Examples 1-16, wherein the minting request comprises a time stamp based on a master clock kept in at least one of the network nodes.

Example 18 includes a method comprising: generating, at a first computing device at a financial institution, a currency request indicating a request for more digital currency to be minted; and applying at least one first-level signature to the currency request using at least one first-level private key; generating a minting request from the currency request and the at least one first-level signature; applying, at a second computing device at a currency management department, at least one second-level signature to the minting request using at least one second-level private key to generate a signed minting request; applying, at a third computing device at a director's office, at least one third-level signature to the signed minting request using at least one third-level private key; and verifying, by at least one of a plurality of network nodes implementing a distributed ledger, the at least one first-level signature, the at least one second-level signature, and the at least one third-level signature using at least one first-level public key, at least one second-level public key, and at least one third-level public key, respectively; and minting the digital currency when the at least one first-level signature, the at least one second-level signature, and the at least one third-level signature are successfully verified.

Example 19 includes the method of Example 18, wherein verifying the at least one first-level signature, the at least one second-level signature, and the at least one third-level signature comprises: verifying that all of the at least one first-level signature were applied before all of the at least one second-level signature; and verifying that all the at least one second-level signature were applied before all of the at least one third-level signature.

Example 20 includes the method of any of Examples 18-19, wherein the distributed ledger is a blockchain using a private, permissioned blockchain platform.

Example 21 includes the method of any of Examples 18-20, wherein verifying the at least one first-level signature, the at least one second-level signature, and the at least one third-level signature comprises: verifying the at least one first-level signature using at least one first-level public key, in the distributed ledger, corresponding to the at least one first-level private key; verifying the at least one second-level signature using at least one second-level public key, in the distributed ledger, corresponding to the at least one second-level private key; and verifying the at least one third-level signature using at least one third-level public key, in the distributed ledger, corresponding to the at least one third-level private key.

Example 22 includes the method of any of Examples 18-21, wherein the third computing device is an air-gapped computing device that does not have any wireless radios or other network access.

Example 23 includes the method of any of Examples 18-22, wherein each of the at least one first-level private key is controlled by a different agent of the financial institution; wherein each of the at least one second-level private key is controlled by a different agent of the currency management department; and wherein each of the at least one third-level private key is controlled by a different agent of the director's office.

Example 24 includes the method of any of Examples 18-23, wherein a single one of the at least one first-level private key is shared by multiple agents of the financial institution, wherein each of the multiple agents accesses the first-level private key with a respective user account that implements an authentication process before access is given to the first-level private key.

Example 25 includes the method of any of Examples 18-24, wherein when each first-level private key is generated, a corresponding first-level public key is generated and stored in the distributed ledger; wherein when each second-level private key is generated, a corresponding second-level public key is generated and stored in the distributed ledger; and wherein when each third-level private key is generated, a corresponding third-level public key is generated and stored in the distributed ledger.

Example 26 includes the method of Example 25, wherein each first-level public key, second-level public key, and third-level public key is stored in the distributed ledger with any of the following: a time-to-live (TTL) after which the respective public key is no longer an active key; an indication that the respective public key is an active key; and an indication that the respective public key is a first-level public key, a second-level public key, or a third-level public key.

Example 27 includes the method of any of Examples 25-26, further comprising rotating one of the third-level public keys by: determining whether the third-level public key is expired; in response to determining that third-level public key is expired, generating a new third-level public key and a new third-level private key at an air-gapped computing device; signing the new third-level public key using one of the at least one third-level private key to produce a signature; sending the new third-level public key and the signature to a first node implementing the distributed ledger; and adding a subsequent signature to a subsequent minting request using the new third-level private key.

Example 28 includes the method of Example 27, further comprising: attempting to verify the signature, received at the respective network node, using the third-level public key in the distributed ledger; storing the new third-level public key and the signature in the distributed ledger only in response to successfully verifying the signature; and minting subsequent digital currency only in response to at least successfully verifying the subsequent signature using the new third-level public key.

Example 29 includes the method of any of Examples 18-28, wherein applying a signature to a payload of data using a private key comprises using Pretty Good Privacy (PGP) protocol by: generating a hash of the payload;

encrypting the hash with the private key; and attaching the encrypted hash to the payload.

Example 30 includes the method of any of Examples 18-29, wherein verifying a signature attached to a payload of data, using a public key corresponding to a private key used to apply the signature, comprises using Pretty Good Privacy (PGP) protocol by: decrypting the signature with the public key; generating a hash of the payload; and comparing the decrypted signature with the hash to determine if they are the same, wherein the signature is successfully verified only if the decrypted signature and the hash are the same.

Example 31 includes the method of any of Examples 18-30, wherein, following minting, the digital currency is transferred to at least one address belonging to the currency management department, after which the digital currency is transferred to at least one address belonging to the financial institution.

Example 32 includes the method of any of Examples 18-31, wherein the third computing device uses a hardware security module (HSM) to apply the at least one third-level signature.

Example 33 includes the method of Example 32, wherein for each third-level signature applied by the HSM with a third-level private key, an HSM attestation token is associated with a corresponding third-level public key stored on the distributed ledger; and wherein each HSM attestation token indicates that the third-level private key, corresponding to the third-level public key, was generated and is protected by the HSM.

Example 34 includes the method of any of Examples 18-33, wherein the minting request comprises a time stamp based on a master clock kept in at least one of the network nodes.

What is claimed is:

1. A system comprising:
    a first computing device at a financial institution;
    a second computing device at a currency management department;
    a third computing device at a director's office;
    a plurality of network nodes communicatively coupled in a peer-to-peer network of network nodes implementing a distributed ledger, wherein the plurality of network nodes does not include the first computing device, the second computing device, and the third computing device;
    the first computing device is configured to:
        generate a currency request indicating a request for additional digital currency to be minted;
        apply at least one first-level signature to the currency request using at least one first-level private key, wherein the at least one first-level private key is part of a plurality of first-level private keys provided to a first set of first-level agents of the financial institution, wherein each first-level private key has a corresponding first-level public key in a plurality of first-level public keys; and
        transmit the currency request with the applied at least one first-level signature to the second computing device at the currency management department;
    the second computing device is configured to:
        receive the currency request with the applied at least one first-level signature from the first computing device;
        generate a minting request from the currency request and the at least one first-level signature;
        apply at least one second-level signature to the minting request using at least one second-level private key to generate a signed minting request, wherein the at least one second-level private key is part of a plurality of second-level private keys provided to a second set of second-level agents of the currency management department, wherein each second-level private key has a corresponding second-level public key in a plurality of second-level public keys; and
        transmit the signed minting request to the third computing device at the director's office;
    the third computing device is configured to:
        receive the signed minting request from the second computing device;
        apply at least one third-level signature to the signed minting request using at least one third-level private key to generate a second signed minting request, wherein the at least one third-level private key is part of a plurality of third-level private keys provided to a third set of third-level agents of the director's office, wherein the first-level agents of the financial institution are different agents than the second-level agents of the currency management department and the third-level agents of the director's office, wherein each third-level private key has a corresponding third-level public key in a plurality of third-level public keys; and
        transmit the second signed minting request to at least one network node of the plurality of network nodes;
    the at least one network node of the plurality of network nodes is configured to:
        receive the second signed minting request from the third computing device;
        attempt to verify the at least one first-level signature against the plurality of first-level public keys until at least one first-level public key corresponding to the at least one first-level private key is successfully verified or all first-level public keys have been tried;
        attempt to verify the at least one second-level signature against the plurality of second-level public keys until at least one second-level public key corresponding to the at least one second-level private key is successfully verified or all second-level public keys have been tried;
        attempt to verify the at least one third-level signature against the plurality of third-level public keys until at least one third-level public key corresponding to the at least one third-level private key is successfully verified or all third-level public keys have been tried; and
        mint the additional digital currency only after the at least one first-level signature, the at least one second-level signature, and the at least one third-level signature are successfully verified.

2. The system of claim 1, wherein the at least one network node of the plurality of network nodes is configured to:
    verify that all of the at least one first-level signature were applied before all of the at least one second-level signature; and
    verify that all the at least one second-level signature were applied before all of the at least one third-level signature.

3. The system of claim 1, wherein the distributed ledger is a blockchain using a private, permissioned blockchain platform.

4. The system of claim 1, wherein the at least one first-level public key is stored in the distributed ledger; wherein the at least one second-level public key is stored in the distributed ledger; and wherein the at least one third-level public key is stored in the distributed ledger.

5. The system of claim 1, wherein the third computing device is an air-gapped computing device that does not have any wireless radios or other network access.

6. The system of claim 1,
wherein each of the at least one first-level private key is controlled by a different agent of the financial institution;
wherein each of the at least one second-level private key is controlled by a different agent of the currency management department; and
wherein each of the at least one third-level private key is controlled by a different agent of the director's office.

7. The system of claim 1, wherein a single first-level private key of the at least one first-level private key is shared by multiple agents of the financial institution, wherein each of the multiple agents accesses the single first-level private key with a respective user account that implements an authentication process before access is given to the single first-level private key.

8. The system of claim 1,
wherein when each respective first-level private key is generated, the corresponding first-level public key is generated and stored in the distributed ledger;
wherein when each respective second-level private key is generated, the corresponding second-level public key is generated and stored in the distributed ledger; and
wherein when each respective third-level private key is generated, the corresponding third-level public key is generated and stored in the distributed ledger.

9. The system of claim 8, wherein each corresponding first-level public key, each corresponding second-level public key, and each corresponding third-level public key is stored in the distributed ledger with any of the following:
a time-to-live (TTL) after which the respective public key is no longer an active key;
an indication that the respective public key is an active key; or
an indication that the respective public key is a first-level public key, a second-level public key, or a third-level public key.

10. The system of claim 8, wherein the third computing device at the director's office is configured to rotate a current third-level public key of the at least one third-level public key by:
determining whether the current third-level public key is expired;
in response to determining that the current third-level public key is expired, generating a new third-level public key and a new third-level private key at an air-gapped computing device;
signing the new third-level public key using one of the at least one third-level private key to produce a signature;
sending the new third-level public key and the signature to a first node implementing the distributed ledger; and
adding a subsequent signature to a subsequent minting request using the new third-level private key.

11. The system of claim 10, wherein the at least one network node of the plurality of network nodes is configured to:
attempt to verify the signature, received at the at least one network node, using the current third-level public key in the distributed ledger;
store the new third-level public key and the signature in the distributed ledger only in response to successfully verifying the signature; and mint subsequent digital currency only in response to at least successfully verifying the subsequent signature using the new third-level public key.

12. The system of claim 1, wherein applying a signature to a payload of data using a private key comprises using Pretty Good Privacy (PGP) protocol by:
generating a hash of the payload;
encrypting the hash with the private key to generate an encrypted hash; and
attaching the encrypted hash to the payload.

13. The system of claim 1, wherein verifying a signature attached to a payload of data, using a public key corresponding to a private key used to apply the signature, comprises using Pretty Good Privacy (PGP) protocol by:
decrypting the signature with the public key to generate a decrypted signature;
generating a hash of the payload; and
comparing the decrypted signature with the hash to determine if the decrypted signature and the hash are the same, wherein the signature is successfully verified only if the decrypted signature and the hash are the same.

14. The system of claim 1, wherein, following minting, the additional digital currency is transferred to at least one address belonging to the currency management department, after which the additional digital currency is transferred to at least one address belonging to the financial institution.

15. The system of claim 1, wherein the third computing device uses a hardware security module (HSM) to apply the at least one third-level signature.

16. The system of claim 15,
wherein for each third-level signature applied by the HSM with a respective third-level private key, an HSM attestation token is associated with a corresponding respective third-level public key stored on the distributed ledger; and
wherein each HSM attestation token indicates that the respective third-level private key, corresponding to the corresponding respective third-level public key, was generated and is protected by the HSM.

17. The system of claim 1, wherein the minting request comprises a time stamp based on a master clock kept in at least one of the plurality of network nodes.

18. A method comprising:
generating, at a first computing device at a financial institution, a currency request indicating a request for additional digital currency to be minted;
applying, at the first computing device at the financial institution, at least one first-level signature to the currency request using at least one first-level private key, wherein the at least one first-level private key is part of a plurality of first-level private keys provided to a first set of first-level agents of the financial institution, wherein each first-level private key has a corresponding first-level public key in a plurality of first-level public keys;
transmitting, from the first computing device to a second computing device at a currency management department, the currency request with the applied at least one first-level signature;
receiving, from the first computing device at the second computing device, the currency request with the applied at least one first-level signature;
generating, at the second computing device at the currency management department, a minting request from the currency request and the at least one first-level signature;

applying, at the second computing device at the currency management department, at least one second-level signature to the minting request using at least one second-level private key to generate a signed minting request, wherein the at least one second-level private key is part of a plurality of second-level private keys provided to a second set of second-level agents of the currency management department, wherein each second-level private key has a corresponding second-level public key in a plurality of second-level public keys;

transmitting, from the second computing device to a third computing device at a director's office, the signed minting request;

receiving, from the second computing device at the third computing device, the signed minting request;

applying, at the third computing device at the director's office, at least one third-level signature to the signed minting request using at least one third-level private key to generate a second signed minting request, wherein the at least one third-level private key is part of a plurality of third-level private keys provided to a third set of third-level agents of the director's office, wherein the first-level agents of the financial institution are different agents than the second-level agents of the currency management department and the third-level agents of the director's office, wherein each third-level private key has a corresponding third-level public key in a plurality of third-level public keys;

transmitting, from the third computing device to at least one network node of a plurality of network nodes, the second signed minting request;

receiving, from the third computing device at the at least one network node of the plurality of network nodes, the second sinned minting request;

attempting verifying, by the at least one network node of the plurality of network nodes implementing a distributed ledger, the at least one first-level signature against the plurality of first-level public keys until at least one first-level public key corresponding to the at least one first-level private key is successfully verified or all first-level public keys have been tried, wherein the plurality of network nodes does not include the first computing device, the second computing device, and the third computing device;

attempting verifying, by the at least one network node of the plurality of network nodes, the at least one second-level signature against the plurality of second-level public keys until at least one second-level public key corresponding to the at least one second-level private key is successfully verified or all second-level public keys have been tried;

attempting verifying, by the at least one network node of the plurality of network nodes, the at least one third-level signature against the plurality of third-level public keys until at least one third-level public key corresponding to the at least one third-level private key is successfully verified or all third-level public keys have been tried; and minting, by the at least one network node of the plurality of network nodes, the additional digital currency only after the at least one first-level signature, the at least one second-level signature, and the at least one third-level signature are successfully verified.

19. The method of claim 18, further comprising:
verifying that all of the at least one first-level signature were applied before all of the at least one second-level signature; and verifying that all the at least one second-level signature were applied before all of the at least one third-level signature.

20. The method of claim 18, wherein the distributed ledger is a blockchain using a private, permissioned blockchain platform.

21. The method of claim 18, wherein the at least one first-level public key is stored in the distributed ledger;
wherein the at least one second-level public key is stored in the distributed ledger; and
wherein the at least one third-level public key is stored in the distributed ledger.

22. The method of claim 18, wherein the third computing device is an air-gapped computing device that does not have any wireless radios or other network access.

23. The method of claim 18,
wherein each of the at least one first-level private key is controlled by a different agent of the financial institution;
wherein each of the at least one second-level private key is controlled by a different agent of the currency management department; and
wherein each of the at least one third-level private key is controlled by a different agent of the director's office.

24. The method of claim 18, wherein a single first-level private key of the at least one first-level private key is shared by multiple agents of the financial institution, wherein each of the multiple agents accesses the single first-level private key with a respective user account that implements an authentication process before access is given to the single first-level private key.

25. The method of claim 18,
wherein when each respective first-level private key is generated, a corresponding first-level public key is generated and stored in the distributed ledger;
wherein when each respective second-level private key is generated, a corresponding second-level public key is generated and stored in the distributed ledger; and
wherein when each respective third-level private key is generated, a corresponding third-level public key is generated and stored in the distributed ledger.

26. The method of claim 25, wherein each corresponding first-level public key, each corresponding second-level public key, and each corresponding third-level public key is stored in the distributed ledger with any of the following:
a time-to-live (TTL) after which the respective public key is no longer an active key;
an indication that the respective public key is an active key; or
an indication that the respective public key is a first-level public key, a second-level public key, or a third-level public key.

27. The method of claim 25, further comprising rotating a current third-level public key of the at least one third-level public key by:
determining whether the current third-level public key is expired;
in response to determining that the current third-level public key is expired, generating a new third-level public key and a new third-level private key at an air-gapped computing device;
signing the new third-level public key using one of the at least one third-level private key to produce a signature;
sending the new third-level public key and the signature to a first node implementing the distributed ledger; and
adding a subsequent signature to a subsequent minting request using the new third-level private key.

28. The method of claim 27, further comprising:
attempting to verify the signature, received at the at least one network node, using the current third-level public key in the distributed ledger;
storing the new third-level public key and the signature in the distributed ledger only in response to successfully verifying the signature; and
minting subsequent digital currency only in response to at least successfully verifying the subsequent signature using the new third-level public key.

29. The method of claim 18, wherein applying a signature to a payload of data using a private key comprises using Pretty Good Privacy (PGP) protocol by:
generating a hash of the payload;
encrypting the hash with the private key to generate an encrypted hash; and
attaching the encrypted hash to the payload.

30. The method of claim 18, wherein verifying a signature attached to a payload of data, using a public key corresponding to a private key used to apply the signature, comprises using Pretty Good Privacy (PGP) protocol by:
decrypting the signature with the public key to generate a decrypted signature;
generating a hash of the payload; and
comparing the decrypted signature with the hash to determine if the decrypted signature and the hash are the same, wherein the signature is successfully verified only if the decrypted signature and the hash are the same.

31. The method of claim 18, wherein, following minting, the additional digital currency is transferred to at least one address belonging to the currency management department, after which the additional digital currency is transferred to at least one address belonging to the financial institution.

32. The method of claim 18, wherein the third computing device uses a hardware security module (HSM) to apply the at least one third-level signature.

33. The method of claim 32,
wherein for each third-level signature applied by the HSM with a respective third-level private key, an HSM attestation token is associated with a corresponding respective third-level public key stored on the distributed ledger; and
wherein each HSM attestation token indicates that the respective third-level private key, corresponding to the corresponding respective third-level public key, was generated and is protected by the HSM.

34. The method of claim 18, wherein the minting request comprises a time stamp based on a master clock kept in at least one of the plurality of network nodes.

* * * * *